(12) United States Patent
Ritchie et al.

(10) Patent No.: US 11,748,179 B2
(45) Date of Patent: Sep. 5, 2023

(54) DYNAMIC TYPE RESOLUTION FOR SHARED MEMORY

(71) Applicant: Arista Networks, Inc., Santa Clara, CA (US)

(72) Inventors: Stuart Ritchie, Bowen Island, CA (US); Sebastian Sapa, Vancouver (CA); Christopher Neilson, Vancouver (CA); Eric Secules, Vancouver (CA); Peter Edwards, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 184 days.

(21) Appl. No.: 17/325,539

(22) Filed: May 20, 2021

(65) Prior Publication Data

US 2021/0271535 A1 Sep. 2, 2021

Related U.S. Application Data

(63) Continuation of application No. 16/516,995, filed on Jul. 19, 2019, now Pat. No. 11,023,299.

(60) Provisional application No. 62/739,118, filed on Sep. 28, 2018.

(51) Int. Cl.
| | |
|---|---|
| *G06F 9/54* | (2006.01) |
| *G06F 9/50* | (2006.01) |
| *G06F 13/16* | (2006.01) |
| *G06F 9/445* | (2018.01) |

(52) U.S. Cl.
CPC .......... *G06F 9/544* (2013.01); *G06F 9/44536* (2013.01); *G06F 9/5016* (2013.01); *G06F 13/1663* (2013.01); *G06F 2209/503* (2013.01); *G06F 2209/504* (2013.01)

(58) Field of Classification Search
None
See application file for complete search history.

(56) References Cited

U.S. PATENT DOCUMENTS

| | | |
|---|---|---|
| 8,051,227 B1 | 11/2011 | Gewirtz et al. |
| 9,996,263 B2 | 6/2018 | Holbrook et al. |
| 11,068,469 B2 | 7/2021 | Sapa et al. |
| 2014/0337593 A1 | 11/2014 | Holbrook et al. |
| 2016/0124889 A1 | 5/2016 | Singh et al. |
| 2020/0104196 A1 | 4/2020 | Ritchie et al. |

*Primary Examiner* — Syed A Roni
(74) *Attorney, Agent, or Firm* — Fountainhead Law Group P.C.

(57) ABSTRACT

A method and apparatus of a network device that allocates a shared memory buffer for an object is described. In an exemplary embodiment, the network device receives an allocation request for the shared memory buffer for the object. In addition, the network device allocates the shared memory buffer from shared memory of a network device, where the shared memory buffer is accessible by a writer and a plurality of readers. The network device further returns a writer pointer to the writer, where the writer pointer references a base address of the shared memory buffer. Furthermore, the network device stores the object in the shared memory buffer, wherein the writer accesses the shared memory using the writer pointer. The network device further shares the writer pointer with at least a first reader of the plurality of readers. The network device additionally translates the base address of the shared memory buffer to a reader pointer, where the reader pointer is expressed in a memory space of the first reader.

20 Claims, 27 Drawing Sheets

DYNAMIC TYPE RESOLUTION FOR SHARED MEMORY

CROSS REFERENCE TO RELATED APPLICATION

This application is a continuation of U.S. patent application Ser. No. 16/516,995, filed Jul. 19, 2019, issued as U.S. Pat. No. 11,023,299, which claims the benefit of U.S. Provisional Patent Application No. 62/739,118, filed Sep. 28, 2018, the disclosures of which are hereby incorporated by reference herein for all purposes.

FIELD OF INVENTION

This invention relates generally to data networking, and more particularly, to managing memory allocations in memory shared between a writer and multiple readers in a network device.

BACKGROUND OF THE INVENTION

A network device can include two different planes that are used to process network traffic, a control plane and a data plane. The data plane receives, processes, and forwards network traffic using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The control plane gathers the configuration data from different sources (e.g., locally stored configuration data, via a command line interface, or other management channel such as Simple Network Management Protocol (SNMP)) and configures the data plane using the configuration data.

In addition, the control plane will store the configuration data in one or more tables. For example, the network device will store the routing information in a routing table that is used by the data plane. The data plane can further include multiple different hardware forwarding engines. Each of these hardware forwarding engines will use the configuration data from these tables by reading the tables in the control plane and updating local copies of the tables for each of the hardware forwarding engines. The control plane includes a writer that writes the configuration data, where multiple readers for the hardware forwarding engines read this data. A problem that can arise is that one of the multiple readers attempts to read data from one of the tables that the writer is currently updating. For example, if a reader reads data that is concurrently being modified by the writer, the reader may read data that is partially updated and, thus, is not valid data that is usable by the reader.

In addition, the readers are useful for building asynchronous, distributed, cooperating processes. Process logic is triggered upon receipt of attribute notifications delivered via the reader from tables, producing further state changes for other services that correspond to this process. The attribute notifications can include updated configuration data for a process that describes an aspect of a state of the originating process. The tables are a central clearinghouse of state, responsible for storage and delivery to the readers and corresponding processes and services. This notification model is a useful mechanism for distributed software development. For example, one way to use notifications is to build a queue in which every change is recorded as a "key" within the table and its new associated value. However, the performance of this type of implementation supports only limited sized tables. For example, the notification model can adequately support routing tables with up to 16,000 routes and updating 8-10 readers. This model, however, may not be able to support tables up to one million routes and 32 readers. Furthermore, this model is implemented with static sized tables that may be inadequately sized for the current operating state of the network device.

SUMMARY OF THE DESCRIPTION

A method and apparatus of a network device that allocates a shared memory buffer for an object is described. In an exemplary embodiment, the network device receives an allocation request for the shared memory buffer for the object. In addition, the network device allocates the shared memory buffer from shared memory of a network device, where the shared memory buffer is accessible by a writer and a plurality of readers. The network device further returns a writer pointer to the writer, where the writer pointer references a base address of the shared memory buffer. Furthermore, the network device stores the object in the shared memory buffer, wherein the writer accesses the shared memory using the writer pointer. The network device further shares the writer pointer with at least a first reader of the plurality of readers. The network device additionally translates the base address of the shared memory buffer to a reader pointer, where the reader pointer is expressed in a memory space of the first reader.

In a further embodiment, a network device that determines a type for an object shared between a writer and a plurality of readers in a network is described. In one embodiment, the network device receives an object that is referenced by a reader pointer for one of the plurality of readers in the network device, where the object has a base type. In addition, the network device performs a lookup in a virtual table pointer export table using the reader pointer, the virtual table pointer export table stores derived type information for a plurality of objects created by the writer. The network device further determines an entry for the object in the virtual table pointer export table and retrieves the derived type for the object related to the entry. The network device additionally loads code associated with the derived type of the object and executes a function using the code for the object.

In another embodiment, a reader in the network device can inspect the code library memory mappings of the writer, and infer the correct code library to load based on the virtual table pointer received in the object. Once the library is loaded by the reader, the reader can use an offset from the virtual table pointer into the loaded library to learn the precise derived type information necessary to execute code for the object.

In one embodiment, a network device that determines a type for an object shared between a writer and a plurality of reader in a network is described. In one embodiment, the network device receives an object that is referenced by a reader pointer for one of the plurality of readers in the network device, the network further creates a local copy of the object. In addition, the network device determines a virtual pointer using at least the local copy of the object. The network device further generates an object type from at least the virtual pointer and creates a reader object using at last the object type.

In another embodiment, a network device that marks a memory region is described. In one embodiment, the network device receives an indication to create a child process by a writer, wherein the writer writes data stored in a writer memory region of memory that is shared between the writer and a plurality of readers in a network device. In addition, the network device creates the child process, wherein the child process creation creates a child process that shares the writer memory region with the writer, where the one reader is one of the plurality of readers. The network device further increments a process counter and marks the writer memory region, where marking the writer memory region delays deallocation of buffers that were allocated before the child process creation.

In a further embodiment, a network device copies a shared memory region upon a creation of a child process. In one embodiment, the network device receives an indication to create the child process by a writer, where the writer writes data stored in a writer memory region of memory that is shared between the writer and a plurality of readers in a network device. In addition, the network initially remaps the writer memory region as private. The network device further creates the child process, where the child process creation creates the child process that shares the writer memory region with the writer, the child process inherits the private memory mappings, and the network device creates a copied writer memory region for the child process. The network device additionally remaps the writer memory region as shared.

In another embodiment, a network device that translates a writer pointer for a reader is described. In one embodiment, the network device receives a writer pointer where the network device includes a writer and a plurality of readers and the writer pointer is a reference to location of a shared memory buffer storing an object that is shared between the writer and the plurality of readers. The network device further determines a writer base pointer for the writer pointer using at least a page mapping table, where the page mapping table stores a mapping between writer memory base pointers and region identifiers. In addition, the network device computes a reader pointer from at least the writer base pointer and the reader base pointer and accesses the object using the reader pointer.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

Figure 1:
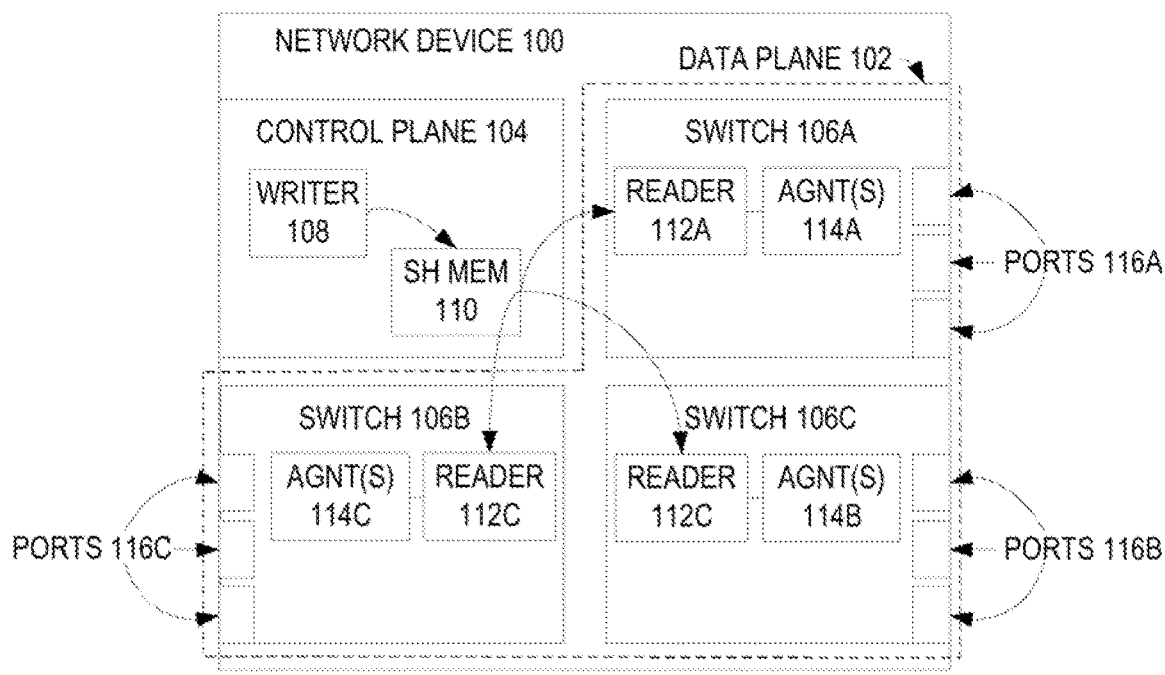
FIG. 1 is a block diagram of one embodiment of a network device that includes a control plane and a data plane.

A method and apparatus of a network device that allocates a shared memory buffer for an object is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network device that allocates a shared memory buffer for an object is described. In one embodiment, the network device includes shared memory that is shared between a writer and multiple readers. Within the shared memory, the network device allocates a memory region that is used for allocating buffers for a writer. In one embodiment, the network device allocates the buffers for the writer, where the writer stores an object in each of the buffers. Each buffer has an associate pointer that references the starting address of that buffer. In a further embodiment, the network device shares the buffer pointer with each of the readers that wish to read the contents of the buffer.

One problem with blindly sharing the pointer between a writer that allocated the buffer and the multiple readers that wish to use the pointer is that a writer and reader may have different memory spaces. For example and in one embodiment, a buffer pointer may have an address of 1000 in the writer's memory space. However, a memory address of 1000 for a reader may point to a different physical memory location. The network device maintains a region map that is used for translating a buffer pointer between the buffer pointer in the writer's memory space and the buffer pointer in the reader's memory space. For example and in one embodiment, a buffer pointer for the writer may have a memory address of 1000, whereas a reader may have buffer pointer of 12000 for the same physical memory location. The network device stores this region map, which a reader can use to translate a writer pointer to the correct pointer for the relevant object stored in memory. For example and in one embodiment, the writer publishes the region map(s) into shared memory. This allows the reader to consult the region map(s) and translate the pointer into the local pointer that is consistent with the memory space of the reader. In this example, a writer memory location of 1000 could translate to a reader memory location of 12000.

In another embodiment, the network device can utilize multiple memory regions for a writer. In this embodiment, the network device allocates multiple memory regions and chains these memory regions together. In alternative embodiments, the multiple memory regions for the writer are not chained together but are accessible by the writer. In addition, the network device further utilizes a de-duplication mechanism such that an object is not stored twice in the shared memory.

In a further embodiment, the network device maintains a virtual table pointer export table that is used to map a virtual table pointer to a type name. This allows for a communication of a type for an object that may not be available to a reader. In one embodiment, a writer will store an object in the shared memory of the network device, where the type of that object is not known until runtime. In this embodiment, some computer languages can create and process objects whose type is known at runtime. For example and in one embodiment, an object could have a type that is a base class at compile time, where at runtime, the object could have a type that is a derived class of the base class. In this example, an object can be declared as a Route, where at runtime this object could have a type that is IPv4Route, which is a derived class of the base class Route. The writer could write the object that has a type of IPv4Route into the shared memory and pass the pointer to this object to a reader. The reader, however, may not know which type of Route is being stored in this buffer. An object with a type of IPv4Route may have a different structure, fields, size, and/or functions then an object of type Route. Thus, the reader will need to know which type of Route is being stored in the buffer associated with the pointer.

For example and in one embodiment, the writer instantiates a C++ type object derived from virtual base classes in the shared memory. In this example and embodiment, by using this dynamic type facility, readers can infer the correct type by simply resolving the virtual table pointer from the object in shared memory. While in one embodiment, the object is illustrated as a C++ object, in alternative embodiments, the object can be another type of object (e.g., Java, D, C#, and/or another type of language object that can have a virtual table).

In one embodiment, the writer publishes the virtual table pointer in the virtual table pointer export table, keyed by virtual table address and containing the string type name. The reader can then read a virtual table pointer from shared memory, perform a lookup in the virtual table pointer export table, and retrieve the associated type name string. Using the type name string, the reader can subsequently load the code required for the derived type, and once done so, can execute functions on the derived type from the buffer contents in shared memory.

In another embodiment, the network device maintains a code library export table that is used to map a virtual table pointer to a code library name. A code library, also commonly known as a shared library, comprises executable code and data, including the derived type information and virtual tables for derived types. In one embodiment, a writer publishes a code library export table for the libraries containing the derived types that it allocates in shared memory. For example and in another embodiment, an operating system can provide one or more map tables for each process running on the network device, where given the process identifier can be used as the code library export table. In one embodiment, a process is an instance of a program being executed, where the program is a set of instructions. In this embodiment, different processes can execute the same and/or different programs.

In one embodiment, a reader can read a virtual table pointer from shared memory, perform a lookup in the code library export table, find the library name that provides the code, data and derived type information for the object, and use the library name to load the library. In a further embodiment, the reader can also use the virtual table pointer and code library export table to compute the virtual table offset location within the code library of where the derived type virtual table resides. The reader can then use the virtual table offset location to locate the memory location of the virtual table of the derived types in the code library loaded by the reader.

In one embodiment, the composition and layout of the virtual table is known such that a reader can inspect the memory contents of the virtual table in the loaded library and retrieve the string name of the derived type, and can execute functions on the derived type from the buffer contents in shared memory.

In another embodiment, the writer stores the object in the shared memory and the reader uses a factory for the derived type of the object to determine the derived type of the object. In this embodiment, a mapping from the object virtual table pointer to object factory can be maintained, where the reader can use this mapping to retrieve an object factory from the virtual table pointer of the stored object. With the object factory, the reader can create a local reader object with the correct derived type.

In another embodiment, the network device marks writer memory regions depending on the number of child processes that are accessing the memory region. For example and in one embodiment, when a reader (e.g., a command line interface (CLI) process) requires certain information from a writer, the network device can create a separate process to handle the reader requests.

In one embodiment, a process executing in a network device (e.g., such as the writer) may need to create another process to execute a different instance of a program than the program instance being executed by the original process. The process that creates the process is the parent process and the created process is the child process. The program instance executed by the child process can be the same or different program that is executed by the parent process. By using a copy of the parent process, the child process can execute the program instance in isolation from the parent program.

In a further embodiment, a parent process can create a child process by creating a copy of the parent process so that a program for the child process can be executed. A problem can occur when shared memory remains shared between the parent and child processes, and, thus, there is no isolation for the child process. In this embodiment, child processes that assumed isolation no longer work properly when shared memory is used. In one embodiment, different mechanisms can be used to address this problem. In one embodiment, one mechanism is to mark the memory from the perspective of the child process. In this embodiment, a view of the writer memory is created for the child process that is immutable. To prevent the child processes from seeing changes, the network device does not deallocate the memory buffers for objects that are deleted while child processes are in progress. When all child processes have exited, the network device can unmark the marked entries and deallocate them. This technique works for simple types of objects that do not have side-effects when deleted.

In another embodiment, the network device maintains a memory list and uses the memory list for smart-pointer reference counted data that has side effects when being deleted (e.g. some C++ object destructors, and C++ objects with virtual tables). This mechanism hooks into the reference counting system for objects, and when the reference count for an object is about to drop to zero, the object is placed on the memory list. When all the child processes are finished, the memory list is purged and all objects are destructed and their memory is deallocated.

In a further embodiment, another mechanism for handling child process creation and shared memory is to use the operating system memory mapping mechanism to create a copy of the shared memory for the child process. In this embodiment, the data can be changed at any time by the parent (and/or child) processes without first deallocating the data. The idea is to force a copy of the shared memory contents up front, just prior to creating the child process. The child process will then inherit the copied shared memory, and thus the child process will have its own isolated copy. As soon as the parent process finishes creating the child process, the parent process can return the shared memory pages back to their original non-copy on write state, and proceed with its operation. In one embodiment, this mechanism can use a system application programming interface (API), such as the mmap( )mremap( ) API of the Linux kernel. Other operating systems support similar memory management APIs that can be used to accomplish this mechanism.

FIG. 1 is a block diagram of one embodiment of a network device 100 that includes a control plane 104 and a data plane 102. In FIG. 1, the network device 100 includes a data plane 102 and a control plane 104. In one embodiment, the data plane 102 receives, processes, and forwards network data using various configuration data (e.g., forwarding, security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The data plane 102 includes multiple switches 106A-C, where each switch 106A-C receives, processes, and/or forwards network traffic. In one embodiment, each switch includes an ASIC that is coupled to one or more ports. For example and in one embodiment, the network device 100 is a single logical switch that includes multiple ASICs, where each ASIC is coupled to multiple ports. In this example, each switch 106A-C includes one ASIC and multiple ports (e.g., 24 ports/ASIC). In one embodiment, each switch 106A-C includes a reader 112A-C, co-processor 114A-C, ports 116A-C, and process(s), respectively. In one embodiment, each reader 112A-C is a process, reads the data in the shared memory 110, and stores the data in a local buffer (not illustrated) of the respective switch 106A-C. In this embodiment, each reader 112A-C is notified of new data modification, and the corresponding reader 112A-C performs lock and wait free reads of the data so as to not read data that is in the middle of being modified. Performing a read of a table as a result of being notified is further described in FIG. 11A below. In one embodiment, the co-processor 114A-C is a processor for each switch 106A-C that can be used to accelerate various functions of the switch 106A-C. For example and in one embodiment, the co-processor 114A-C can accelerate bulk reads and write from memory in the control plane 104 to the local buffers. In one embodiment, the ports 116A-C are used to receive and transmit network traffic. The ports 116A-C can be the same or different physical media (e.g., copper, optical, wireless and/or another physical media). In one embodiment, each of the agent(s) 114A-C is a component of software that reads the configuration database, interacts with some resource (hardware, a network protocol, or some other software component or process (e.g., the operating system kernel)), and produces a status of that resource. In one embodiment, the network device can be a switch, router, hub, bridge, gateway, etc., or any type of device that can communicate data packets with a network. In one embodiment, the network device can be a virtual machine and/or a container.

In one embodiment, the control plane 104 gathers the configuration data from different sources (e.g., locally stored configuration data, via a command line interface, or other management channel (e.g., SNMP, Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol)) and writes this configuration data to shared memory 110. In one embodiment, the control plane 104 includes a writer 108 that writes configuration data to the shared memory 110 by performing wait-free writes and reader notifications, such that a reader reading the data can read data that is not in the middle of being modified.

In one embodiment, shared memory 110 is shared between the writer 108 and the readers 112A-C. In this embodiment, the shared memory 110 is stored in memory (e.g., system memory of the network device) that is shared between the data plane 102 and the control plane 104. In one embodiment, the shared memory 110 store configuration data (e.g., forwarding, security, quality of service (QoS), and other network traffic processing information). In this embodiment, the writer 108 is a process that adds, deletes, or updates the data stored in the shared memory 110 and, can notify the readers 112A-C that there is new data in the tables to be read. The reader 112A-C receives the notification, determines which data has been modified from the notification, and reads this data from the shared memory 110. In addition, the reader 112A-C updates the corresponding agents 114A-C with the modified data. In one embodiment, the writer 108 notifies the reader using a notification queue. In one embodiment, the writer 108 stores the notification at the head of the notification queue for a particular piece of data (e.g., a routing table entry) and invalidates previous notifications in this queue for this particular piece of data.

Figure 2:
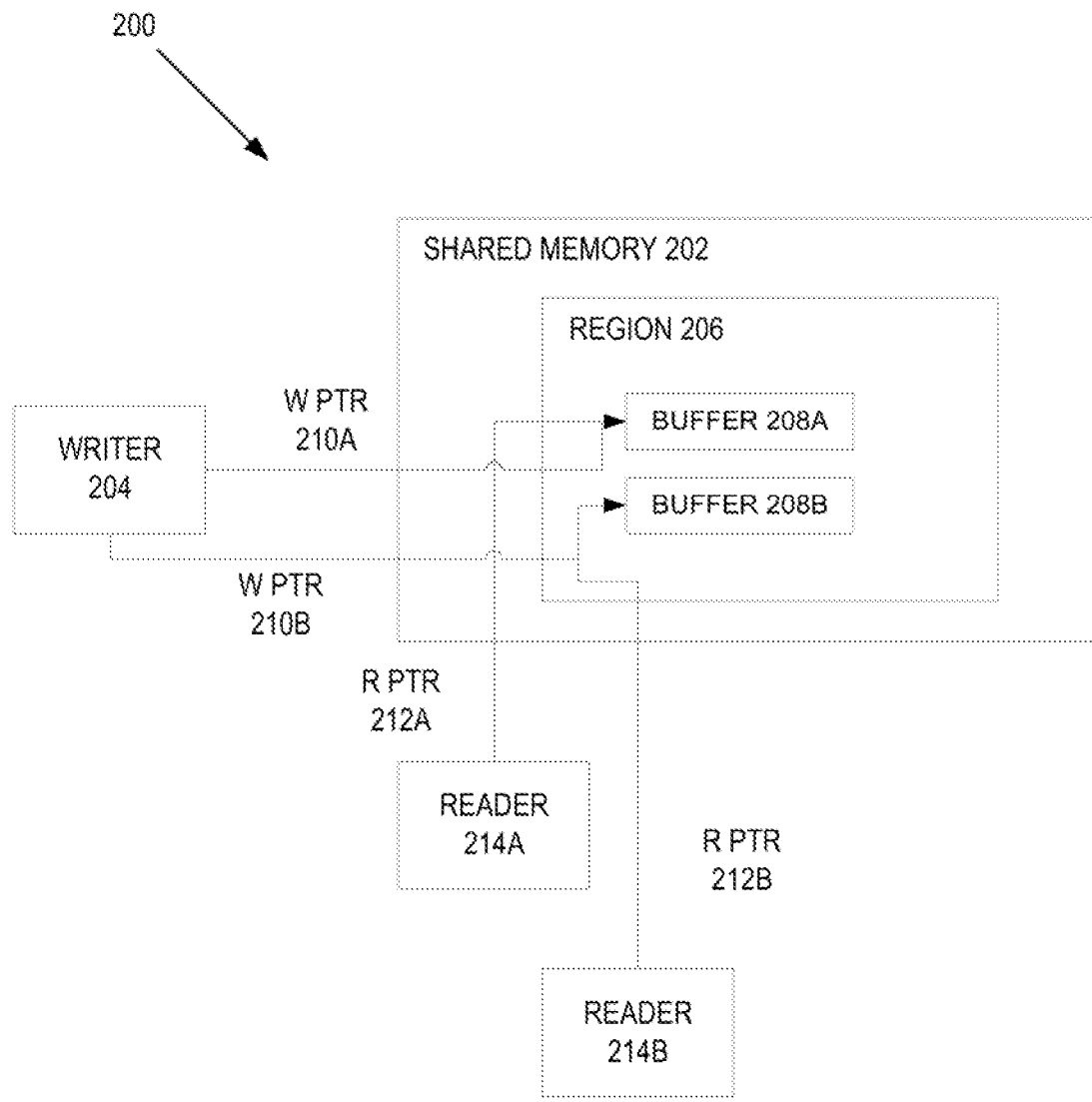
FIG. 2 is a block diagram of one embodiment of shared memory of a network device that is shared between a writer and multiple readers.

FIG. 2 is a block diagram of one embodiment of shared memory 202 of a network device 200 that is shared between a writer 204 and multiple readers 214A-B. In FIG. 2, the shared memory 202 includes an allocated memory region 206. In one embodiment, this region 206 is allocated for writer 204. In this embodiment, the writer 204 allocates buffers 208A-B to store one or more objects created by the writer 204. In one embodiment, the object can be data of a simple type (e.g., integer, floating point number, enumerated type, string, and/or any other simple type of data), a data structure (e.g., a data structure that includes one or more fields with the same or different datatypes), a linked list, tree, and/or another type of memory data structure that is composed of one or more pointers that point to one or more data components for this data structure, and/or any other type of object stored in memory. In one embodiment, the writer 204 and shared memory 202 is the writer 108 and shared memory 110, respectively, as described in FIG. 1 above. In one embodiment, the shared memory is organized by memory mapped regions.

In one embodiment, the writer 204 accesses each of the buffers 208A-B through a corresponding writer pointer 210A-B. In one embodiment, there can be multiple writers allocating buffers in the shared memory, where each writer will have its own allocator that will provide this writer with distinct writer regions. Furthermore, a single writer (e.g., writer 204) could have multiple threads, which might share the same memory regions for that writer process. In one embodiment, the pointer is a reference to a memory location (e.g., a memory address). In this embodiment, the memory address for the pointer is represented using the memory space defined for the writer 204. How a memory space is defined, and in one embodiment, can depend on different factors (e.g., type of operating system, whether the writer is a 32-bit or 64-bit application, amount of available memory for the writer to access, and/or other factors that are used to determine a memory space for an application).

In one embodiment, each of the readers 214A-B can access the one or more objects in the buffers 208A-B using one of the reader pointers 212A-B. In this embodiment, one or more of the readers 214A-B can have a different memory space for that reader 214A-B. In this embodiment, the memory space for each of the readers 214A-B can depend on one or more of the factors listed above. Furthermore, one or more of the readers 214A-B can have a different memory space than for the writer 204. If the writer 204 has a different memory space than either one of the readers 214A-B, then pointers with the same memory address for a writer 204 and a reader 214A or B, will likely point to different physical memory regions as the memory addressing for the writer 204 and the reader 214A or B is different. For example and in one embodiment, the memory address 1000 for the writer may point to a different physical memory location than a memory address 1000 for one of the readers 214A-B. In a further example, an embodiment, a reader 214A-B translates the physical memory somewhere in its address space once the reader 214A-B consults the region map (described below). In this example, the initial state can have for the writer pointer 0x1000 maps to physical memory address 0x2000. For the reader 214A-B, memory addresses 0x1000 and 0x5000 might not map to anything in the reader's 214A-B memory space. The reader 214A-B consults the region map, attaches to the file, which causes 0x5000 to now be translated to physical memory address 0x2000. The memory address 0x1000 for the reader 214A-B may not map to anything for the reader 214A-B. Trying to access this address by the reader 214A-B will cause the process to crash.

In order to keep the pointers consistent for the writer 204 and the reader 214A-B, the network device stores region map(s) of the writer memory, such that a reader 214A-B can translate the one or more of the writer pointers 210A-B to corresponding reader pointers 212A-B, where these pointers point to the same buffer. In one embodiment, the network device maintains one or more region maps, such that each of the writer pointers 210A-B to a corresponding reader pointer 212A-B, such that the reader and writer pointers that are referencing the same buffer 208A-B, and referencing the same physical memory location. In this embodiment, the network device maintains a region map used for translating between the writer pointers 210A-B and the reader pointers 212A-B. For example and in one embodiment, the network device can maintain a region map that is used to translate between a writer pointer 210A for buffer 208A and the corresponding reader pointer 212A. In this example, if the reader 214A receives the writer pointer 210A, the reader 214A performs a lookup using the writer pointer 210A to determine the corresponding reader pointer 212A for the buffer 208A.

In one embodiment, the region map file includes an entry with the address of the region 206 in the writer's address space, the length of the region, and the region identifier. The region map can contain entries ordered by writer address. There can be two region maps: an active map that the readers used for lookups; and a standby map that the writer modifies. When a writer completes a modification, the standby map becomes the active map and the active map becomes the standby map.

For example and in one embodiment, the writer 204 can be a 32-bit application and one of the readers 214A-B can be a 64-bit application. Alternatively, the writer 204 can be a 64-bit application and one of the readers 214A-B can be a 32-bit application. In one embodiment, if the reader and the writer are different N-bit applications, these applications will have different memory spaces. Alternatively, if both the reader and writer are 64-bit applications or N-bit applications for sufficiently large N, these applications may have the same memory spaces.

Figure 3:
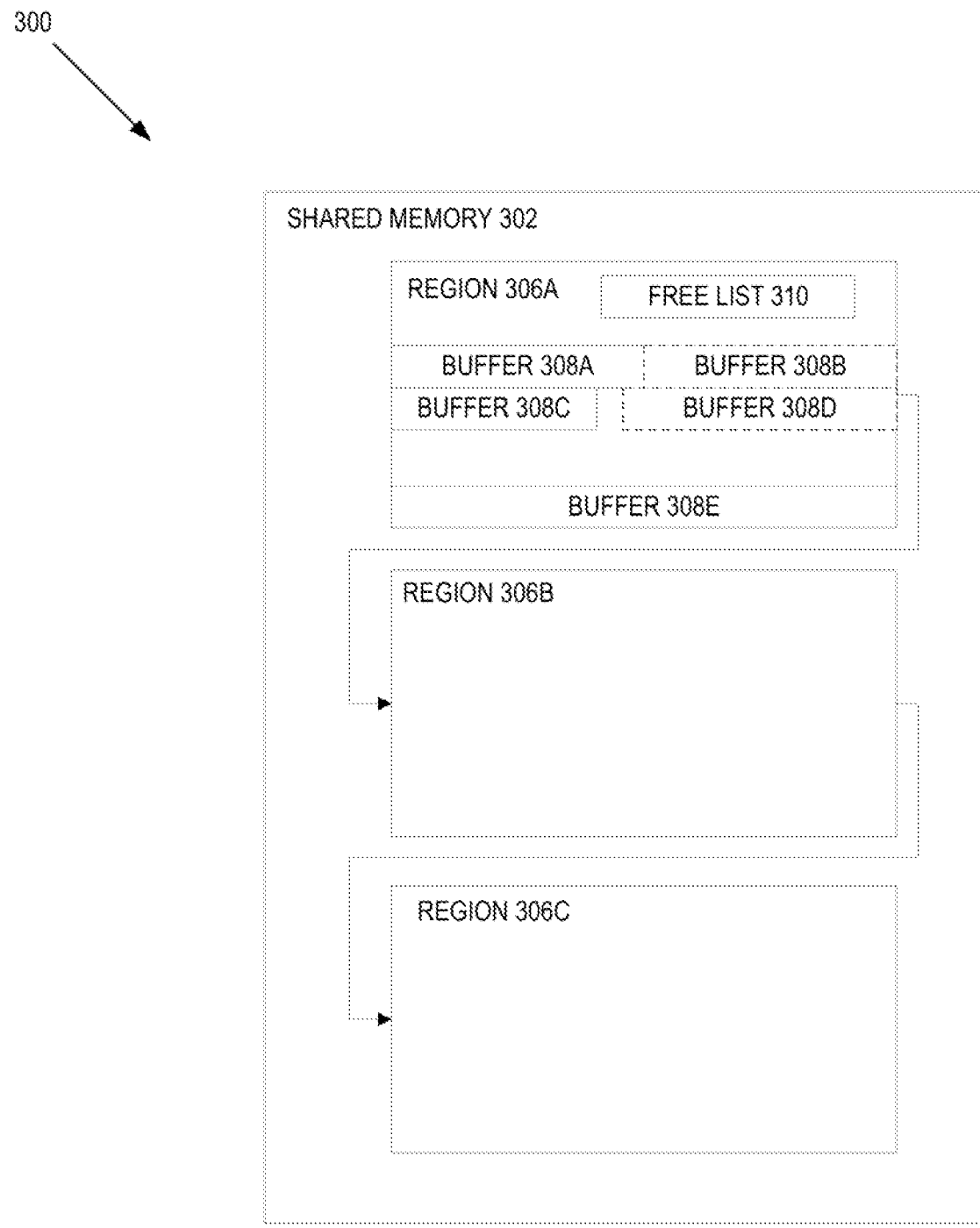
FIG. 3 is a block diagram of one embodiment of shared memory with multiple regions allocated for a writer.

FIG. 3 is a block diagram of one embodiment of shared memory 302 with multiple regions 306A-C allocated for a writer. In FIG. 3, the shared memory 302 includes several regions 306A-C that are allocated for a writer (not illustrated). In one embodiment, as the writer allocates buffers to store objects, one or more regions can be allocated so as to efficiently manage the buffer allocations. In this embodiment, it is more efficient to allocate one region at a time using system calls and allocate buffers within those regions as needed by the writer. In one embodiment, additional regions can be allocated if there is not enough space in an existing region for a newly allocated buffer. For example and in one embodiment, the network device can allocate region 306B when there is not enough free space in region 306A to store a requested buffer. In one embodiment, a buffer can be allocated in a contiguous space in one of the regions 306A-C or can be allocated in piecemeal using a free list 310. In this embodiment, the network device maintains a free list 310 to track the unallocated spaces within region 306A. The free list can grow if a buffer is de-allocated by the writer. For example and in one embodiment, a writer initially allocates buffers 308A-E and further de-allocates buffers 308B and D. The buffers 308B and D are added to the free list 310, where these de-allocated buffers can be used for allocation of new buffers. In one embodiment, the network device maintains different free lists for the different regions, can use one free list for all the regions, and/or a combination therein. While in one embodiment, there are three memory regions 306A-C illustrated for the shared memory, in alternative embodiments, the shared memory 302 can include more or less different memory regions.

Figure 4:
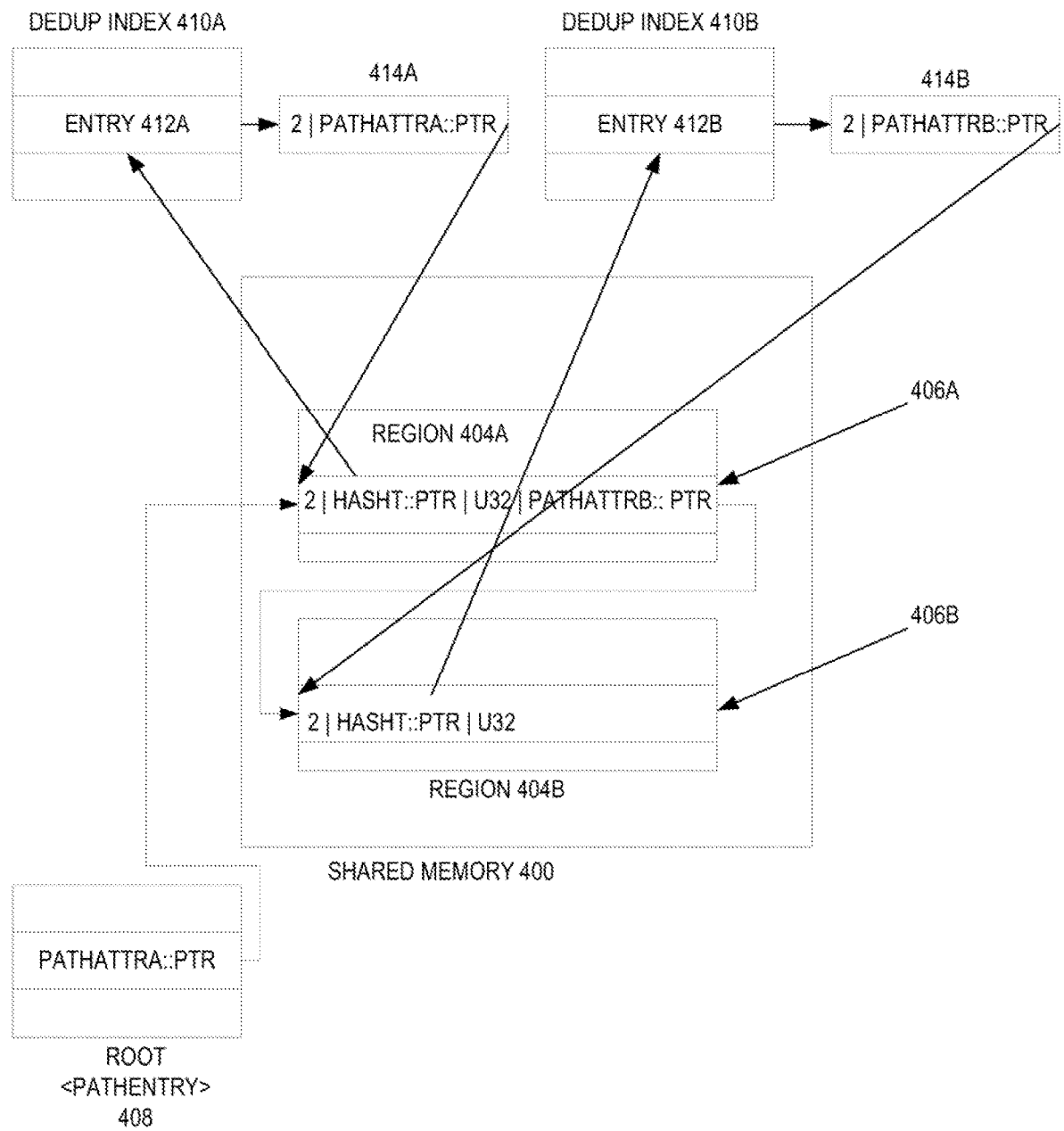
FIG. 4 is a block diagram of one embodiment of shared memory with multiple regions allocated using de-duplication for stored objects.

FIG. 4 is a block diagram of one embodiment of shared memory 400 with multiple regions 404A-B allocated using de-duplication for stored objects. While in one embodiment, the stored objects are path attributes (as illustrated in FIG. 4), in alternative embodiments, the stored objects can store other types of data. In FIG. 4, the shared memory 400 includes regions 404A-B for writer (not illustrated). In each of region 404A-B, buffers 406A-B are allocated for the writer. A path attribute pointer is created in a shared memory entry 408. In one embodiment, this serves as an entry point into the data structure stored in the shared memory 400 for the writer and points to the buffer 406A. In addition, the objects stored in the shared memory 400 can be de-duplicated, so that redundant copies of the same data are not stored in the shared memory 400.

In buffer 406A, an object for a path attribute is stored. In one embodiment, the path attribute includes an unsigned 32-bit integer and a hash table pointer that points to the de-duplication index 410A. The de-duplication index 410A includes an entry 412A that references entry 414A that is a path attribute pointer referencing the buffer 406A. In the buffer 406B, is a hash table pointer and an unsigned 32-bit integer, where the pointer points to a de-duplication index 410B that includes the entry 412B. The entry 412B references entry 414B that is a path attribute pointer referencing the buffer 406B.

Figure 5:
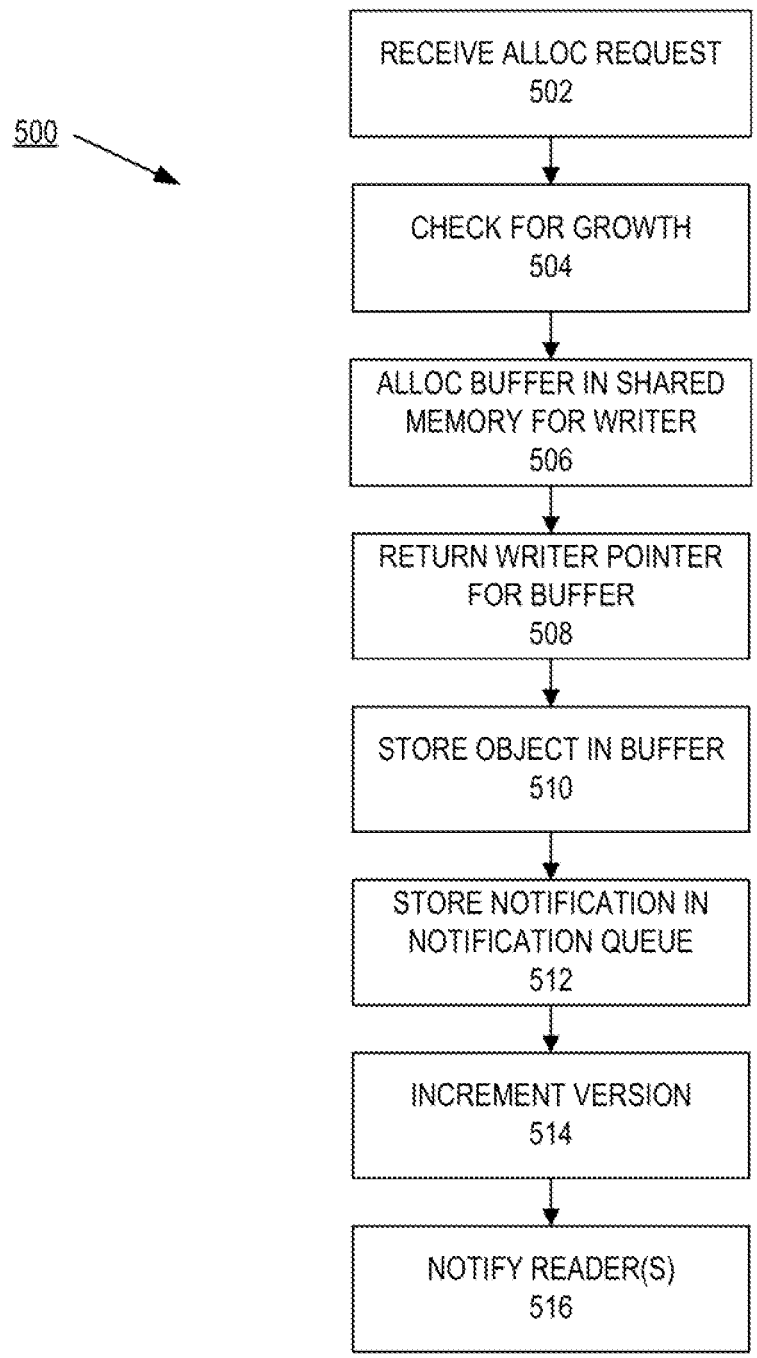
FIG. 5 is a flow diagram of one embodiment of a process to allocate buffers for a writer.

FIG. 5 is a flow diagram of one embodiment of a process 500 to allocate buffers for a writer. In one embodiment, a writer performs process 500, such as the writer 204 as described in FIG. 2 above. In FIG. 5, process 500 begins by receiving an allocation request at block 502. In one embodiment, the allocation request can be a memory allocation request for an object. In this embodiment, the memory allocation request can be for a memory block of a certain size, for an object having a fixed size, or another type of memory allocation request. At block 504, process 500 determines if there is an appropriate region to allocate from based on the requested allocation size. In one embodiment, process 500 searches the free spaces of the currently allocated regions for a block that can be allocated. If there is a block, execution proceeds to block 506 below. If there is not a block in the currently allocated regions or if there is not enough free space, process 500 allocates another region for the writer, where this new region is linked back to one of the existing allocated regions for the writer. In one embodiment, the region can be of a fixed size, such as 32 pages. In addition, process 500 creates the new region and assigns the region a unique region identifier. The address in the writer's address space for the start of the region will have a base address. The length of the region is LENGTH. The file which is used to back the shared memory is named using the region identifier. Process 500 adds an entry into the standby region map, where the entries are ordered by region base address. The entry will include the base address, the size, and the region identifier. In addition, process 500 performs a lock-free atomic swap of the active and standby region maps. The old active region map becomes the standby, and the old standby region map becomes the active. Process 500 further increments a number of swaps counter. Checking for growth is further described in FIG. 8 below. With the new region allocated, execution proceeds to block 506 below.

At block 506, process 500 allocates a buffer in shared memory for the writer. In one embodiment, by allocating the buffer, a writer pointer is created for that buffer and points to the beginning of the allocated buffer. Process 500 returns the writer pointer to the writer at block 508. At block 510, process 500 stores the object in the buffer. In one embodiment, process 500 uses the writer pointer to store the object in the buffer referenced by the writer pointer. Process 500 stores a notification in a notification queue at block 512. In one embodiment, the notification queue is used to store notifications for readers, where notification is used to notify reader that an object has been stored in the shared memory. For example and in one embodiment, process 500 uses a notification queue as described in in U.S. Pat. No. 9,996,263, entitled "System and Method of a Shared Memory Hash Table with Notifications", filed on May 5, 2014.

At block 514, process 500 increments a version for the object. In one embodiment, the version increment is a lock-free version increment for a root entry of the object as described below. Process 500 notifies one or more readers through the stored notification. In one embodiment, the writer performing a shared memory allocation, deallocation or changing existing buffer contents does not by itself notify readers that something has changed. Instead, the writer uses a notification system outside of the shared memory allocator to inform readers of important changes. In a further embodiment, not all changes to shared memory need to be notified. Often, notifying the root object of a tree of objects is sufficient for a reader to consume all or part of the tree, as it wishes. In one embodiment, when reading and acting on data from shared memory, readers need a way to validate that the data read is consistent, as the concurrent writer could be making changes while the data is read. In this embodiment, there are two mechanisms to support this. A Version Anchor concept can be used when processing a notification. The lock-free version is contained within an entry (which is at the root of a chain/tree of object entries). The reader reads a local snapshot of the version from this entry, where this entry includes a writer pointer (or many writer pointers) to other objects in shared memory. The reader can now translate the writer's pointer(s) contained within this entry. The translated pointer can be used to read data from shared memory. To check if the data read is consistent, the reader re-reads the version from the entry. If the version has not changed, the reader is guaranteed that whatever data it has read is consistent. If the version has changed, the reader can take some other action, such as to ignore the notification. The reader can continue to follow and read the chain of objects, comparing against the root version whenever it wants to guarantee consistent data.

Another way and embodiment to validate a read is passive validation. The passive version validation technique is used by a reader who is holding a writer pointer(s), and wants to verify that the data referred to by the writer pointer hasn't changed since it was first read. In this case, the version is contained within a metadata field of the shared memory entry itself. The reader first receives a notification containing a writer pointer to some object Foo. For instance, this could be a root entry that holds a pointer to Foo. The reader reads some or all the data from Foo. The reader also reads the version embedded within the shared memory entry's metadata for Foo. This version is then cached locally with the writer pointer. Later, the reader can validate that the writer pointer still points to the same data, by simply comparing the shared memory version with the cached version.

Figure 6:
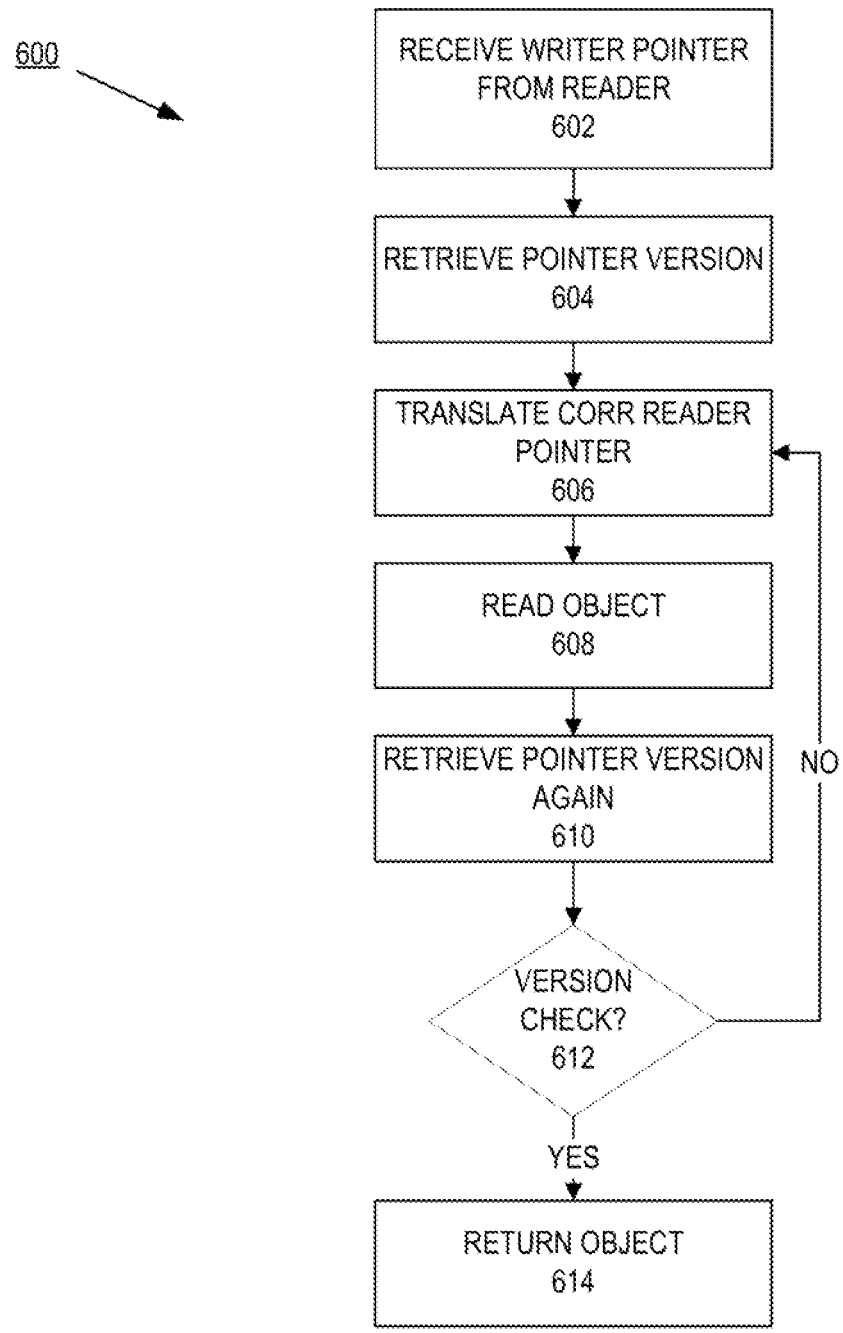
FIG. 6 is a flow diagram of one embodiment of a process to read an object for a reader.

In one embodiment, a writer can publish, modify, and/or withdraw data from shared memory concurrently with readers accessing the state, without locks. In this embodiment, this is achieved by employing careful lock-free memory protocols between the writer and readers. FIG. 6 is a flow diagram of one embodiment of a process 600 to read an object for a reader. In one embodiment, a reader performs process 600, such as the reader 214A-B as described in FIG. 2 above. In FIG. 6, process 600 begins by receiving a buffer pointer. In one embodiment, the writer pointer is the original writer pointer for the buffer storing the object the reader wishes to retrieve. In another embodiment, the writer pointer is a pointer that is translated from the original writer pointer to a pointer that references the same buffer where the pointer is in the memory space for that reader. In addition, process 600 gets the number of swaps from the active region map. Process 600 further performs a search within the active region map (e.g., a binary search or another type of search) for the buffer that includes this pointer (e.g., by using the base address of the buffer and the length). After performing the search, process 600 compares the value of the number of swaps previously retrieved and current number of swaps value. If the same and the search failed, process 600 notifies the upper layer that the translation failed. The upper layer is responsible for determining if this is okay or not. For instance, if the version at the root has changed, then it is okay to skip this entry. If the root version has not changed, there may be corruption and the writer should be notified. If the number of swaps is the same and the region was found, process 600 checks to see if the region is already mapped with the file region identifier. If not, process 600 maps it at this time. Process 600 takes the offset of the buffer pointer from the writer region base address, and adds that offset to the reader region base address. Process 600 returns this pointer. In one embodiment, various caching mechanisms can be used on the reader side to make translation faster. This could include: a local copy of the region map, to make it so the reader does not need to consult shared memory if it has already mapped a region; a reader side TLB cache; hierarchical page tables; and/or other types of improvements for translations. In a further embodiment, readers "lazily" map regions when necessary. Thus, if a reader is interested in a subset of the data stored in the shared memory allocator, the reader is not burdened with mapping the entire shared memory.

At block 604, process 600 retrieves the pointer version. In one embodiment, the version is used to perform a lock free read of the object stored in the buffer. Process 600 retrieves the object from the buffer at block 608. At block 610, process 600 again retrieves the pointer version. Process 600 performs a version check between the two versions that were retrieved above. If the versions are different, execution proceeds to block 606 above, using the version retrieved at block 610 in place of the version previously retrieved at block 604. If the versions are the same, execution proceeds to block 614 below, where process 600 determines that the read is successful and returns the object.

Figure 7:
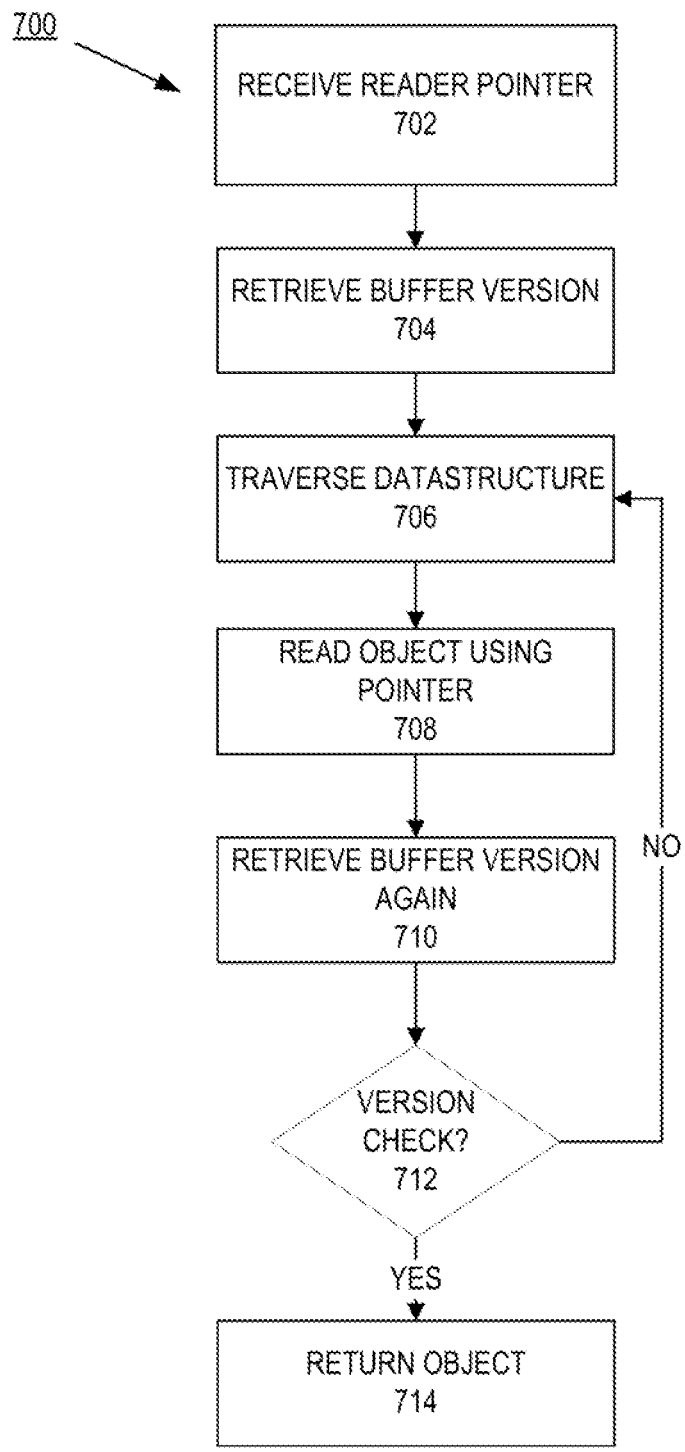
FIG. 7 is a flow diagram of one embodiment of a process to read an object from a data structure for a reader.

In one embodiment, as described above, process 600 can retrieve an object stored in the shared memory using a lock free mechanism by comparing versions. In another embodiment, the reader can retrieve an object that is part of a larger memory data structure, such as a tree or linked list. In this embodiment, the reader can retrieve an object in a lock free mechanism that is part of a larger memory data structure. FIG. 7 is a flow diagram of one embodiment of a process 700 to read an object from a data structure for a reader. In one embodiment, a reader performs process 700, such as the reader 214A-B as described in FIG. 2 above. In FIG. 7, process 700 begins by receiving a reader pointer at block 702. As described above, the reader pointer can be the original writer pointer address value or can be the writer pointer address value that is translated into the memory space of the reader. At block 704, process 700 retrieves the buffer version. In one embodiment, the buffer version a root version for the larger memory data structure, such as the tree or link list. In this embodiment, if one of the nodes of the larger memory data structure changes (e.g., such as a new node is added or is modified), then the larger memory data structure will have a new version. In this embodiment, the version can be the root version if the chain of objects is immutable. Due to immutability, no individual entry in the chain can change without the root changing. Process 700 traverses the memory data structure to locate the desired object at block 706. At block 708, process 700 reads the object. Process 700 retrieves the buffer version again. At block 712, process 700 compares the two versions. If the versions are different, execution proceeds to block 706 above, using the version retrieved at block 710 in place of the version previously retrieved at block 704. If the versions are the same, execution proceeds to block 714, where process 700 returns the object.

In one embodiment, the data stored in the allocator is immutable. That is, the data is guaranteed to never change for the life of the allocation. The way for the data to change is for the entry to be deallocated and re-allocated by some different object. Thus, a versioning model can be built based on when the top-level object is allocated and deallocated. With immutable state, it is not necessary to version individual objects in an object chain. It is only necessary to version the root object.

In a further embodiment, data stored in shared memory is deduplicated. That is, the writer ensures that only one copy of the data exists, and can thus be shared. Deduplicated objects are shared via reference-counted smart pointers, allowing automatic garbage collection when the last remaining reference disappears. In addition, deduplicated objects can also be immutable. In another embodiment, using smart-pointers allows for important consistency checking leverage: reader can be guaranteed consistency as long as at least one smart-pointer references an object (e.g., the writer pointer reference in the root entry). Furthermore, it is possible to have a scheme where the reader modifies reference counts.

Figure 8:
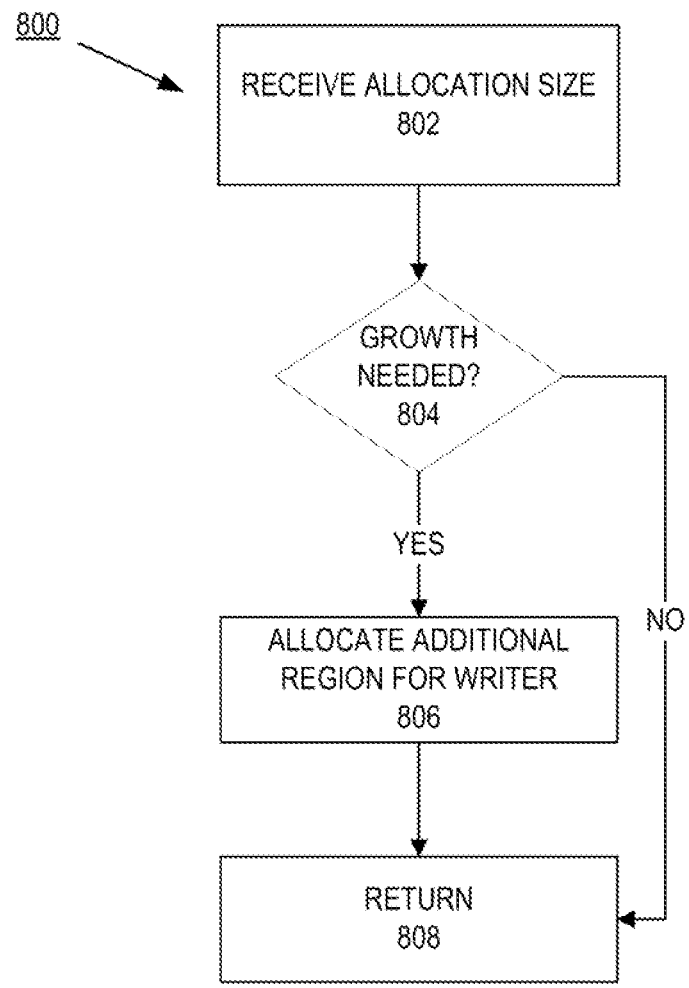
FIG. 8 is a flow diagram of one embodiment of a process to allocate a region for an object.

As described above, the network device can allocate regions as needed so as to store objects. FIG. 8 is a flow diagram of one embodiment of a process 800 to allocate a region for an object. In one embodiment, a writer performs process 800, such as the writer 204 as described in FIG. 2 above. In FIG. 8, process 800 begins by receiving the allocation size for the object at block 802. In one embodiment, the allocation size can be specifically determined at the time of the allocation request or can be inferred from the type of object being created. At block 804, process 800 determines if growth is needed. In one embodiment, growth is needed if there is not enough free space in one or more of the currently allocated regions for the writer. If no growth is needed, execution proceeds to block 808 below, or process 800 returns. If growth is needed, at block 806, process 800 allocates one or more regions for the writer. In one embodiment, each allocated region is of a fixed size and is linked back to the currently allocated regions for the writer. In one embodiment, allocating one or more regions causes a new entry in the region map. Execution proceeds to block 808 where process 800 returns.

Figure 9:
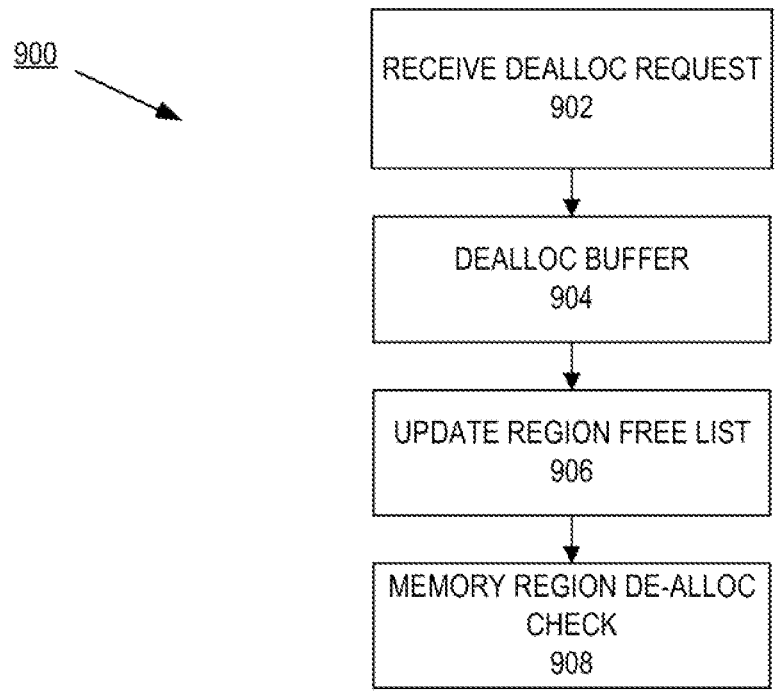
FIG. 9 is a flow diagram of one embodiment of a process to deallocate a buffer.

In one embodiment, the writer can de-allocate buffers as well as allocate them. In one embodiment, the de-allocating a buffer adds this buffer to the free list for a region. FIG. 9 is a flow diagram of one embodiment of a process 900 to deallocate a buffer. In one embodiment, a writer performs process 900, such as the writer 204 as described in FIG. 2 above. In FIG. 9, process 900 begins by receiving a de-allocation request to block 902. In one embodiment, the de-allocation request includes a pointer to the buffer. In this embodiment, the pointer to the buffer can be the original writer pointer that was created when the buffer was originally allocated. At block 904, process 900 de-allocates the buffer. Process 900 updates the regions free list at block 906. In one embodiment, process 900 adds the buffer to the free list for that region. At block 908, process 900 performs a memory region de-allocation check. In one embodiment, process 900 checks whether that this memory region is empty and is a candidate for de-allocation. In this embodiment, the memory region can be a candidate for de-allocation if there are no other buffers allocated for that region. In one embodiment, the writer tracks when a page within a region has no allocated entries. It can then punch a hole in the memory at that page. This causes the physical memory to be released to the system, but maintains the memory mapping in the writer's virtual address space. When the writer eventually needs to allocate an entry from this page, the writer can request physical memory from the operating system. For example and in one embodiment, a 32 page region could have, for instance, 3 pages with allocated entries (say page 1, page 3, and page 17). The writer could maintain the entire virtual mapping of 32 pages, but page 2, pages 4-16, and pages 19-32 would not use any physical memory. In a further embodiment, the writer can deallocate memory regions when the writer decides that none of these memory regions are needed anymore, even though they still contain allocated entries, and just wholesale delete the memory regions. In this embodiment, the writer can perform this deallocation when the writer restarts and finds prior shared memory contents. The regions are wiped out and a clean slate is started from scratch.

In one embodiment, an "active unmapping" mechanism is employed by the readers to remove region mappings when they are no longer used. For the writer, when the entries of a region are deallocated, the writer can delete the region from the system. This frees up system resources. However, simply deleting a region by itself does not automatically trigger readers in seeing the deletion—the readers must be "told" the region has been deleted. In one embodiment, the trigger readers use to learn that a region has been deleted is through the Linux kernel inotify mechanism. The reader applies an inotify watch on the directory of shared memory regions, and when the writer removes a file, the reader automatically receives a trigger from the kernel telling which region was deleted. The reader can then unmap the region from its address space, if necessary. While in one embodiment, the inotify mechanism can be used, in alternative embodiments, different signaling mechanisms can be used (e.g., sockets, other shared memory, and/or other operating system functions for process notifications).

In one embodiment, a writer will store an object in the shared memory of the network device, where the type of that object is not known until runtime. In this embodiment, some computer languages (e.g., C++) can create and process objects whose type is known at runtime. For example and in one embodiment, an object could have a type that is a base class, where at runtime, the object could have a type that is a derived class of the base class. In this example, an object can be declared as a route, where at runtime this object could have a type that is IPv4Route, which is a derived class of the base class route. The writer could write the object that has a type of IPv4Route into the shared memory and pass the pointer to this object to a reader. The reader, however, may not know which type of route is being stored in this buffer. An object with a type of IPv4Route may have a different structure, fields, size, and/or functions than an object of type route. Thus, the reader will need to know which type of route is being stored in the buffer associated with the pointer, in order to adequately process this object.

For example and in one embodiment, the writer instantiates a C++ type derived from virtual base classes in the shared memory, and by using this dynamic type facility, readers can infer the correct type by resolving the virtual table pointer from the object in shared memory.

In one embodiment, the writer publishes its virtual types in a shared memory table, keyed by virtual table address and containing the string type name. The reader can then read a virtual table pointer from shared memory, perform a lookup in the shared memory table, and retrieve the associated type name string. In one embodiment, the shared memory table is a virtual table pointer lookup table that maps the virtual table pointer to a type (e.g., a derived class, C++ type, and/or another type).

Figure 10:
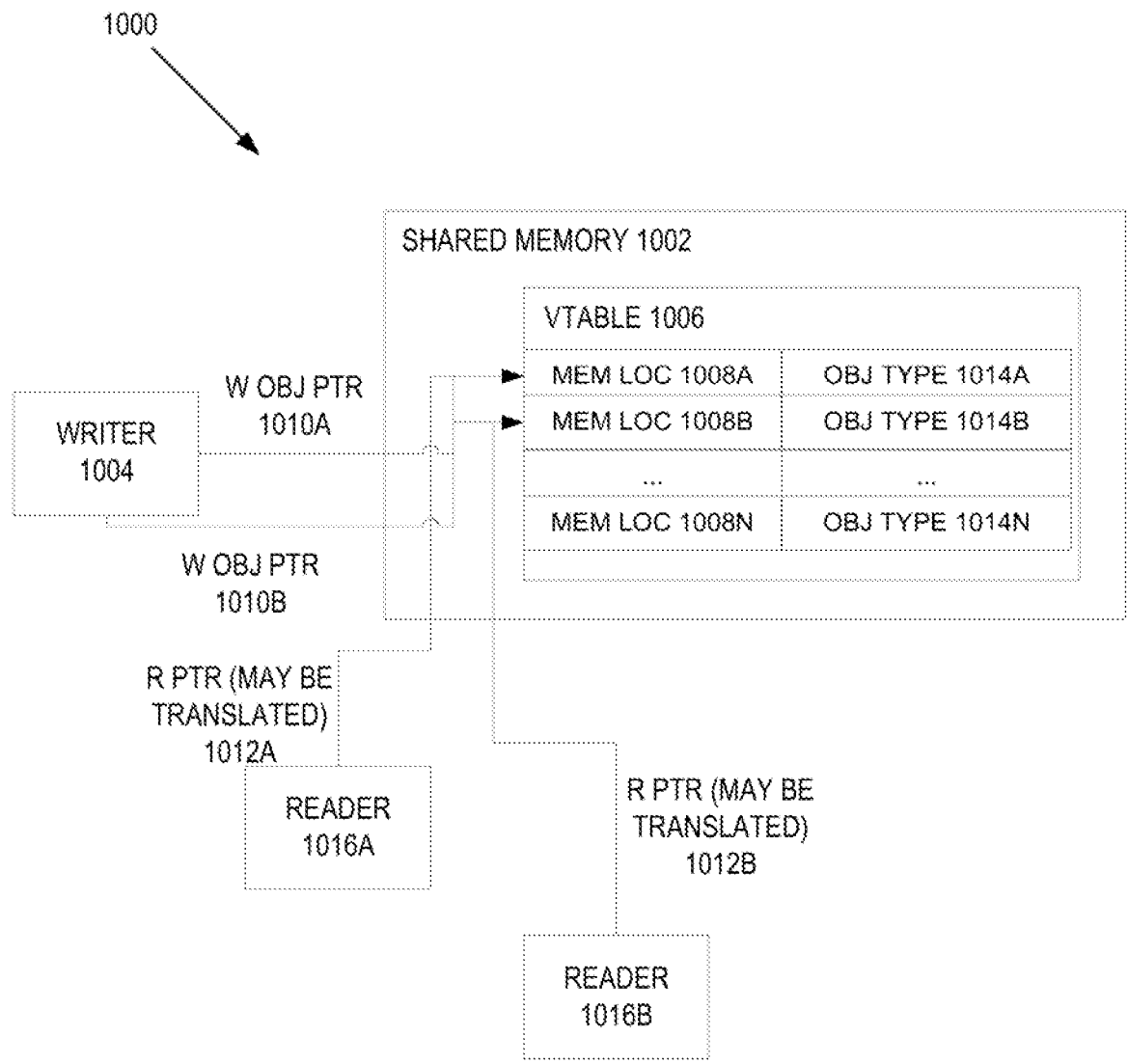
FIG. 10 is a block diagram of one embodiment of a virtual pointer export table that stores a mapping of virtual table pointers in the writer's address space to the corresponding object types.

In one embodiment, the reader can use the received virtual table pointer and perform a lookup in a shared memory table that stores a mapping between the virtual table pointer and the type. In this embodiment, the reader would use the received virtual table pointer and get the type of object back from the lookup in the shared memory table. With this type of object known, the reader can load the proper information (e.g., object structure, size, fields, functions, etc.) and use this information to process the object. FIG. 10 is a block diagram of one embodiment of a shared memory table that stores memory locations and object types for the objects that have a virtual table at that memory location. In FIG. 10, the network device 1000 includes shared memory 1002. The shared memory 1002 includes a shared memory table 1006 that maps memory locations 1008A-N to object types 1014A-N. Thus, a writer includes the object types 1014A-B for the corresponding objects that have virtual tables which are stored in the memory locations 1008A-B, respectively. The readers 1016A-B can use these pointers 1012A-B (which may be translated) to retrieve the virtual table addresses from the objects. These addresses can be used to perform lookups in the shared memory table 1006 for the corresponding object types 1014A-B. In one embodiment, the reader pointers 1012A-B may be translated or mapped depending on the memory space definition of these readers 1016A-B.

Figure 11:
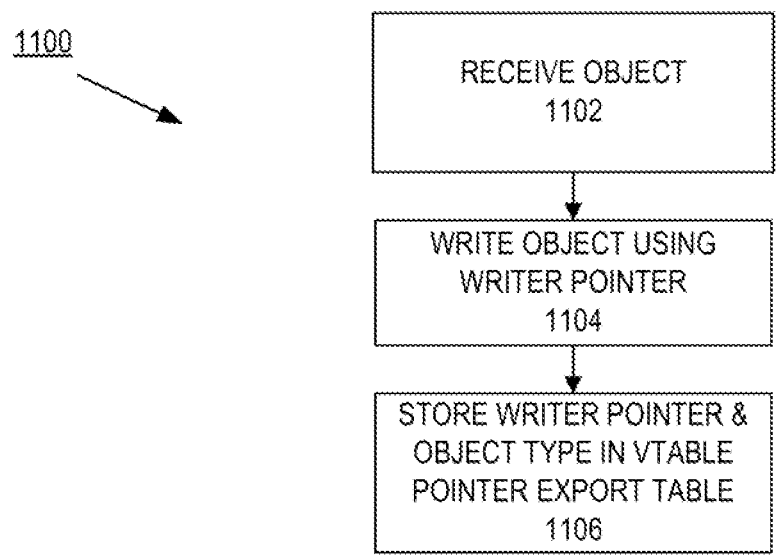
FIG. 11 is a flow diagram of one embodiment of a process to store a writer pointer and an object type.

FIG. 11 is a flow diagram of one embodiment of a process 1100 to store a writer pointer and an object type. In one embodiment, a writer performs process 1100, such as the writer 204 as described in FIG. 2 above. In FIG. 11, process 1100 begins by receiving an object at block 1102. At block 1104, process 1100 writes the object using the writer pointer for the subject. Process 1100 retrieves the virtual table address from the object, and stores the address and an object type in the shared memory table at block 1106. By storing the object type for this memory location (e.g., the virtual table address for the object type), a reader can translate this writer pointer to its own address space, follow the pointer to the object to read the virtual table address, and perform a lookup in the shared memory table to determine the object type for the object stored at this memory location. With the known object type, the reader can load the correct derived type logic to retrieve and process this object. In one embodiment, the use of the shared memory tables allows a writer to share an object type to a reader. Without this mechanism, the reader may just blindly use the base class as the object type, which will likely lead to an error as the base class may have a different data structure and memory layout for that object which has a different type (or derived class).

Figure 12:
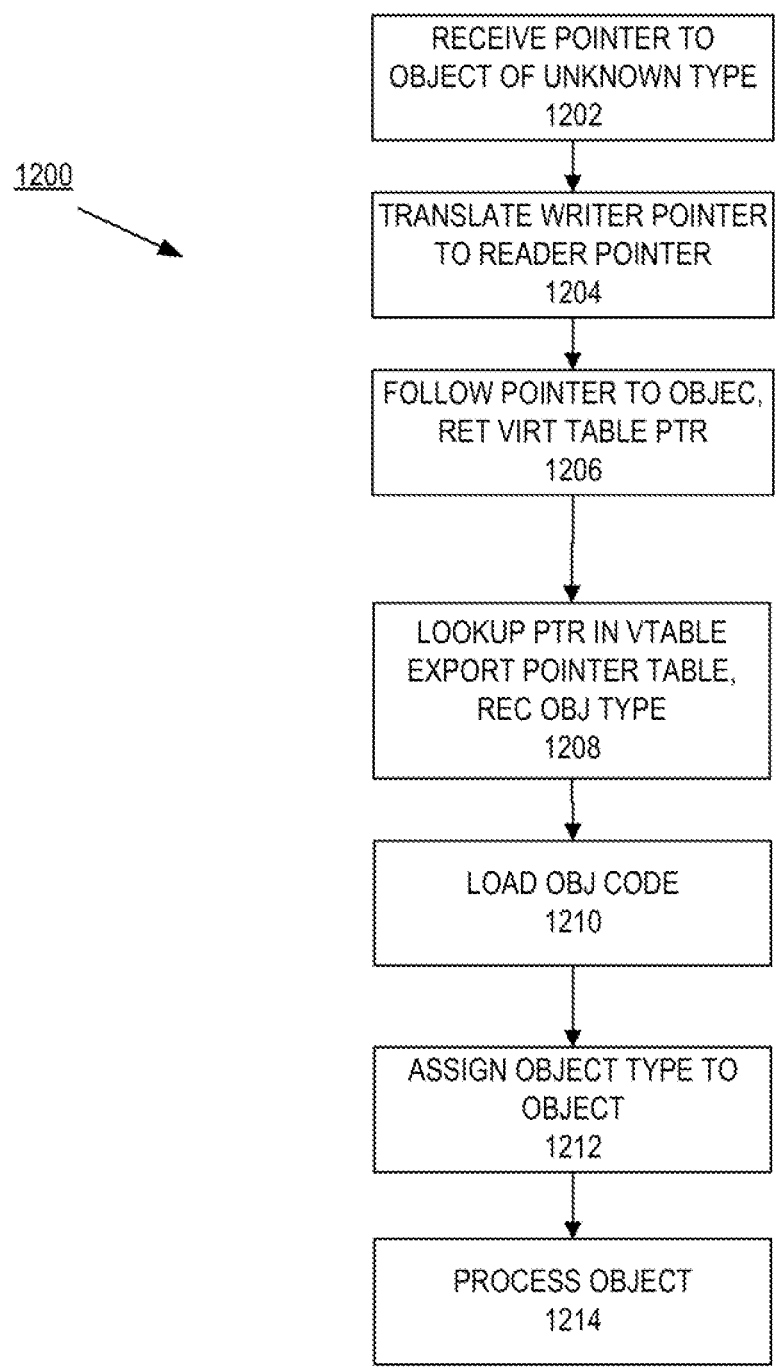
FIG. 12 is a flow diagram of one embodiment of a process to lookup an object type.

FIG. 12 is a flow diagram of one embodiment of a process 1200 to lookup an object type. In one embodiment, a reader performs process 1200, such as the reader 214A-B as described in FIG. 2 above. In FIG. 12, process 1200 begins by receiving a pointer to an object of an unknown type of block 1202. In one embodiment, the type is not entirely unknown to the reader. The reader knows that it receives a pointer to a type belonging to a specific virtual hierarchy. The reader just does not know which specific type in that hierarchy the reader has. For example and in one embodiment, the top-level class could be type Foo. It could have child classes FooV6, FooV4, FooLu, FooLuV4, FooLuV6. The reader receives a pointer to Foo, extracts the virtual table pointer, looks up the virtual table pointer in the virtual table pointer export table, and then finds out that the type is actually a FooV4.

In one embodiment, process 1200 translates the pointer into an address of the reader memory space at block 1204. At block 1206, process 1200 follows the pointer to the object and retrieves the virtual table address. For example and in one embodiment, in C++, the virtual table address is stored as the first four bytes of the objects (or 8 bytes for a 64-bit memory space). At block 1208, process 1200 looks up a virtual table pointer for an object in the virtual table pointer export table. In one embodiment, process 1200 receives an object type string if the virtual table pointer is in the virtual table pointer export table. At block 1210, process 1200 loads the object code, if needed. In one embodiment, if the object code has not been loaded, process 1200 loads this object code, so that the reader can execute this object code as needed. Process 1200 assigns the object type to the object at block 1212. At block 1214, process 1200 processes the object.

Figure 13:
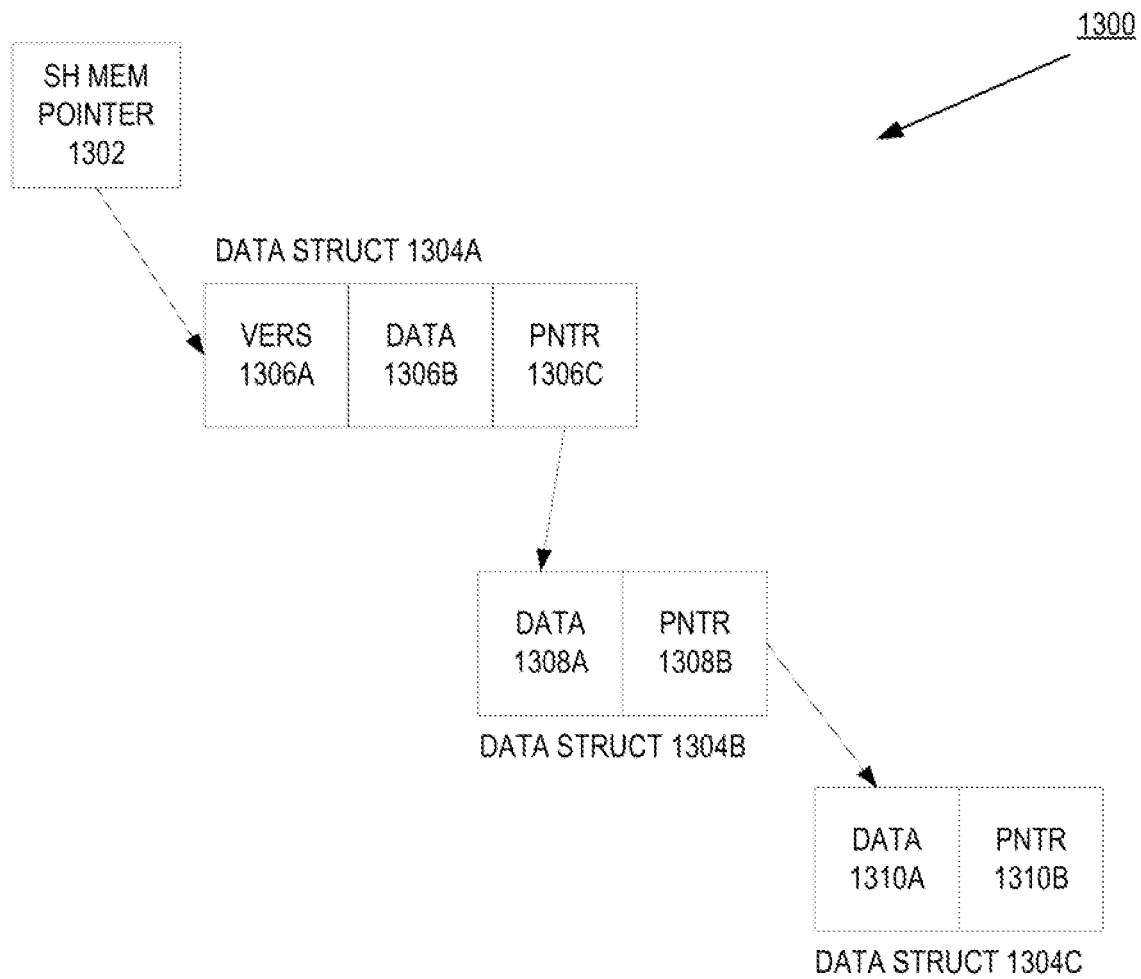
FIG. 13 is a block diagram of one embodiment of a data structure stored in shared memory.

FIG. 13 is a block diagram of one embodiment of a data structure stored in shared memory. In FIG. 13, the data structure 1300 is a linked list of individual objects 1304-C. While in one embodiment, the data structure 1300 is a linked list of objects, in alternative embodiments the data structure can be a different memory structure, such as a tree, linked list, heap, graph, and/or another type of data structure stored in memory. The data structure 1300 includes a shared memory pointer 1302 that points to the top level object 1304A. In one embodiment, the shared memory pointer 1302 provides the top level access to the data structure 1300. In one embodiment, the object 1304A includes a version 1306A, data 1306B, and pointer 1306C. In one embodiment, the version 1306A is a version that is incremented if any of the objects 1304A-C is added, deleted, or modified. Thus, in one embodiment, any change to the data structure 1300 will cause the version to increment. In this embodiment, if a version changes while readers are reading an object, the reader will know that the data read by the reader may not be consistent and will need to perform the read again. The use of the incrementing versions for the data structure 1300 allows for a lock free read.

In one embodiment, the data 1306B stores the data for the object 1304A. This data 1306B can be a simple type (e.g., integer, floating point number, and/or another simple type), another data structure, another object, and/or other data. The pointer 1306C references another object, such as object 1304B. The object 1304B includes data 1308A and pointer 1308B. The data 1308A is used to store the data for the object 1304B. The pointer 1308B references another object 1304C of the data structure 1300. In this embodiment, the object 1304C also includes data 1310A in the pointer 1310B. The data 1310A includes the data for the object 1304C and the pointer 1310B is a null pointer since this object 1304C does not reference another object. In another embodiment, the individual nodes can have any layout, they don't necessarily need to have a next pointer. Thus if there is no other object, there may just not have any pointer in 1304C at all.

Figure 14:
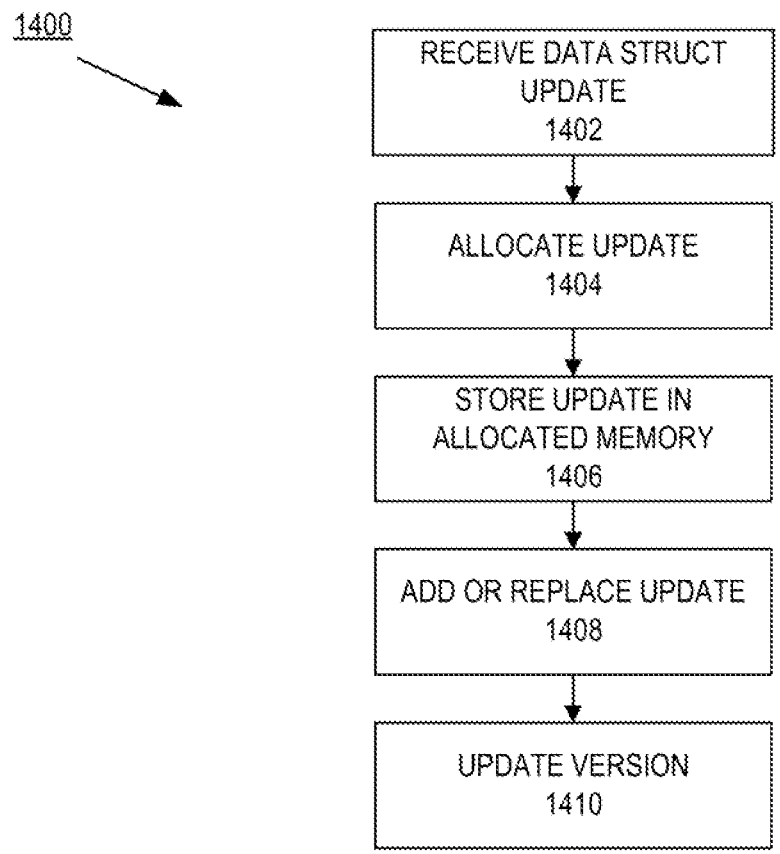
FIG. 14 is a flow diagram of one embodiment of a process to update a data structure.

FIG. 14 is a flow diagram of one embodiment of a process 1400 to update a data structure. In one embodiment, a writer performs process 1400, such as the writer 204 as described in FIG. 2 above. In FIG. 14, process 1400 begins by receiving the data structure update at block 1402. In one embodiment, the data structure update can be the adding of a new node to the data structure, deletion of a node from a data structure, modification to the contents of one of the objects in the data structure. In one embodiment, process 1400 treats modification to contents of one of the objects in the data structure as the deletion of that node and an addition of a new node. At block 1404, process 1400 allocates an update node for the data structure if needed. Process 1400 allocates the update node if there is an addition of a new node to the data structure or a modification to an existing object in the data structure. For a node deletion, the allocation is not needed. Process 1400 stores the update in the allocated memory at block 1406. This step is done for the addition of a new node to the data structure or a modification of an existing node. For a modification of existing node, process 1400 stores the update in the newly allocated node, which will replace the old node later on. At block 1408, process 1400 inserts the newly allocated node into the data structure (if needed). In one embodiment, if the newly allocated node is added to the data structure, a pointer to another node is updated to point to the newly allocated node. If the newly allocated node is replacing an existing node in the data structure, the old node is detached from the data structure, the newly allocated node is inserted into the data structure, and the old note is de-allocated. At block 1410, process 1400 updates the version of the data structure. In one embodiment, the version is stored in the topmost object of the data structure. In this embodiment, process 1400 increments the version. In this embodiment, the entire chain of objects appears immutable to the reader (the only way an object can change is if the root also changes). This allows memory savings (no need for a version in each object). The reader can cache a reference to the top-level version and pass it all the way down.

In one embodiment, if a process that has allocated shared memory buffers creates a child process, that child process will have those buffers shared with this process. But the shared memory buffers remain shared between the child process and parent process, and thus there is no isolation between the parent and child processes. So, these child processes that assumed isolation no longer work properly when shared memory used.

Figure 15:
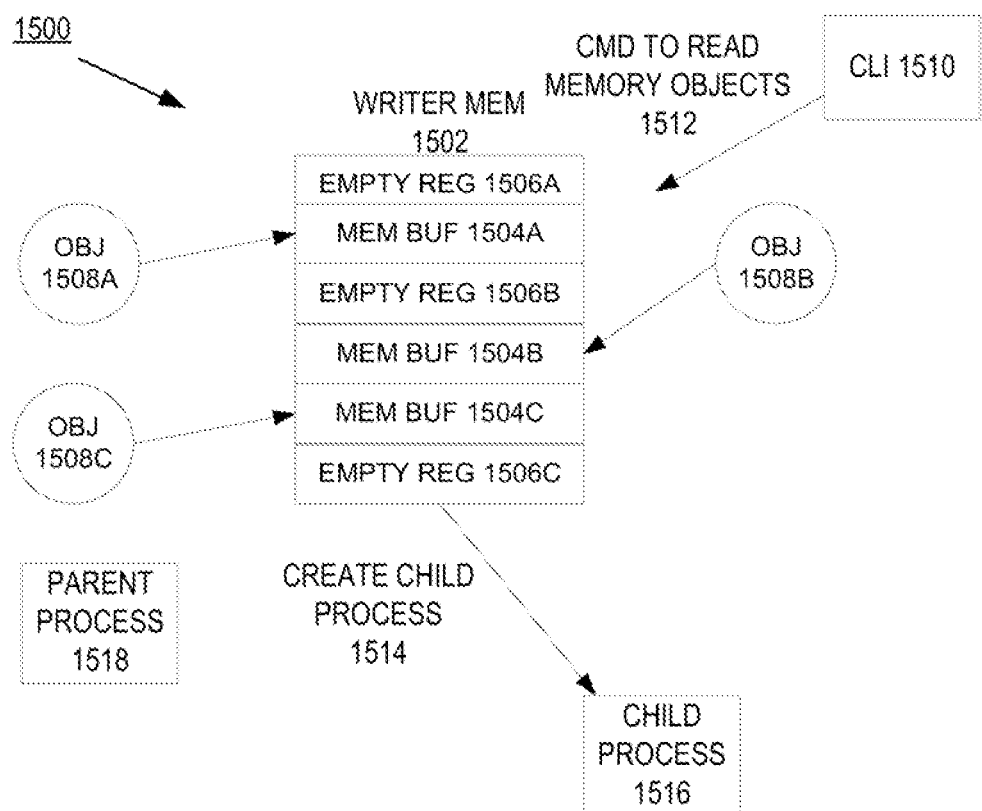
FIG. 15 is a block diagram of one embodiment of a process creation and copy of writer memory.

FIG. 15 is a block diagram of one embodiment of a process creation and copy of writer memory. In FIG. 15, the system 1500 includes writer memory 1502 of a parent process (e.g., the parent can be a writer). In one embodiment, the writer memory 1502 is part of the shared memory, such as the shared memory 202 as described in FIG. 2 above. The writer memory 1502 includes unallocated memory buffers in a region 1506A-C and allocated memory buffers 1504A-C. While in one embodiment, the writer memory 1502 is illustrated with three allocated memory buffers 1504A-C and three empty regions 1506A-C, in alternative embodiments, the writer memory can have more or less memory buffers and/or empty regions. In one embodiment, each of the memory buffers 1504A-C includes objects 1508A-C that are stored in the memory buffers 1504A-C. In this embodiment, a process, such as a command line interface (CLI) process 1510, issues a command to read the memory objects 1512, some or all of which may be in shared memory. In this embodiment, in order to service the read, a process is created by the parent process 1518 (e.g., the parent creates a child process 1514). Furthermore, creating this child process 1516 allows the parent process 1518 to continue doing important work, while the child process services an expensive command. Without the creation of the child process, the parent process would be forced to service the process 1510, and parent process 1518 would be unable to do important work. As per above, the writer memory 1502 is still shared between the parent process 1518 and the child process 1516. If the child process 1516 is expecting that the memory for the child process 1516 is isolated, and some or all of this memory is shared memory, problems can occur as the contents of the shared memory may change unbeknownst to the child process 1516.

In one embodiment, different mechanisms can be used to address this problem. In one embodiment, one mechanism is to mark the memory from the perspective of the child process. In this embodiment, a view of the writer memory is created for the child process that is immutable. To prevent the child process from seeing changes, the network device does not deallocate memory buffers after an object is destroyed while child process(es) are in progress. When all child processes have exited, the network device can unmark the marked entries and deallocate them. This technique works for simple types that do not have side-effects when deleted. Marking and unmarking memory is further described in FIG. 16 below.

In another embodiment, the network device maintains a memory list and uses the memory list for smart-pointer reference counted data that has side effects when being deleted (e.g. some C++ object destructors, and C++ objects with virtual tables). This mechanism hooks into the reference counting system for objects, and when the reference count is about to drop to zero, the object is placed on the memory list. When all child processes are finished, the memory list is purged and all objects are destructed and have their memory deallocated. Using a memory list is further described in FIG. 17 below.

In a further embodiment, another mechanism for handling creating child processes and shared memory is to use the operating system memory mapping mechanism to create a copy of the shared memory for the child process. In this embodiment, the data can be changed at any time by the parent (and/or child) processes without first deallocating the data. The idea is to force a copy of the shared memory contents up front, just prior to creating the child process. The child will then inherit the copied shared memory, and thus the child will have its own isolated copy. As soon as the parent process finishes creating the child process, the parent can return the shared memory pages back to their original non-copy on write state, and proceed with its operation. In one embodiment, this mechanism can use a system application programming interface (API), such as the mmap( )mremap( ) API of the Linux kernel. Other operating systems support similar memory management APIs to accomplish this mechanism. Forcing a copy for a child process is further described in FIG. 19 below.

Figure 16:
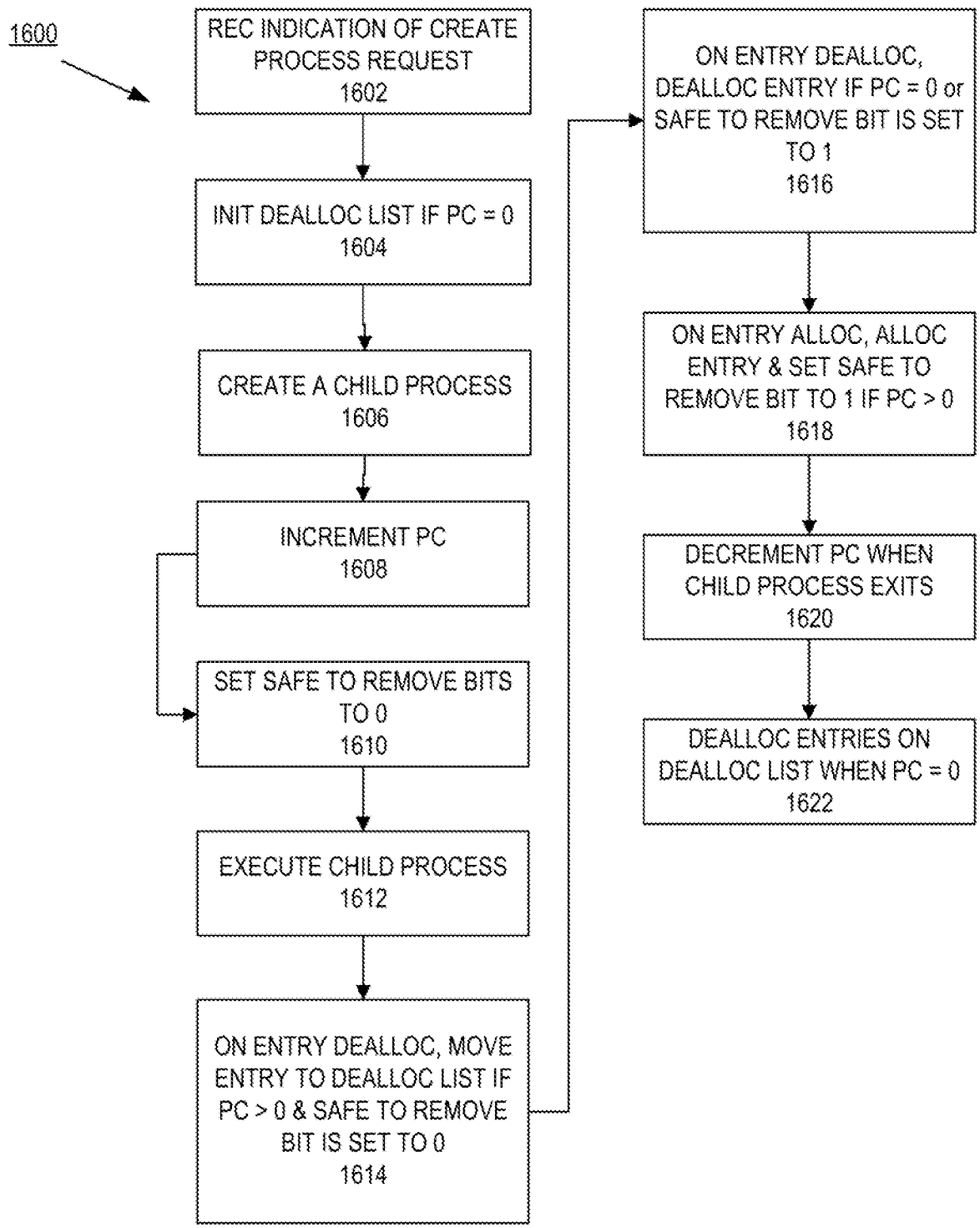
FIG. 16 is a flow diagram of one embodiment of a process to mark and unmark a writer memory region.

As illustrated above, the network device can use a mark and unmark mechanism to manage the shared memory for a parent and child process. FIG. 16 is a flow diagram of one embodiment of a process to mark and unmark a writer memory region. In one embodiment, a writer performs process 1600, such as the writer 204 as described in FIG. 2 above. In FIG. 16, process 1600 begins by receiving a process creation indication at block 1602. In one embodiment, a process creation indication is a command, instruction, executable, and/or other type of command that indicates that process 1600 is to create a child process. At block 1604, process 1600 initializes a deallocation list if the process counter is set to zero. The process counter indicates the number of active child processes the parent process has created.

At block 1606, process 1600 creates a child process. At this point, the writer memory is shared between the parent and child processes. Process 1600 increments the process counter at block 1608. At block 1610, process 1600 sets a safe to remove bitset to all zeros. In one embodiment, the safe to remove bitset is used to determine whether an allocated buffer (or entry) is part of the buffers for the writer after a child process is created. In this embodiment, an allocated buffer that is allocated after the child process is created will not be referenced by the child process and so is a candidate for deallocation. In one embodiment, the safe to remove bitset could be per-region, if the free lists are per-region. For example and in one embodiment, if per-region, the region can maintain a bitset of safe to remove entries. For a region that can hold 100 entries, the bitset would be 100 bits. Process 1600 executes the child process at block 1612.

In one embodiment, while the child process (or other child processes) are executing, buffers can be allocated and deallocated by the writer. Allocations after a child process was created are candidates for deallocation, as these newly allocated buffers will not be referenced by the child process. For deallocations of buffers, deallocation of buffers allocated after the child process is created can be safely deallocated as described above. Buffers allocated before the child process is created should not be deallocated, as these are part of the shared memory inherited by the child process from the parent and may be referenced by the child process. Instead of deallocating these buffers right away, these buffers are moved to a deallocation list, which can be deallocated later.

At block 1614, on an entry (or equivalently, buffer) deallocation, process 1600 moves the entry to the deallocation list if the process counter is greater than zero and the safe to remove bit is set to 0. If either of these conditions is not true, process 1600 deallocates the entry if the process counter is equal to zero or the safe to remove bit is equal to one. At block 1618, upon entry allocation, process 1600 allocates the entry and sets the safe to remove bit to one if the process counter is greater than zero.

At block 1620, process 1600 decrements the process counter when a child process exits. Process 1600 deallocates the entries on the deallocation list when the process counter equals zero at block 1622. With no executing child processes, the process count is 0, and deallocation list is empty.

Figure 17:
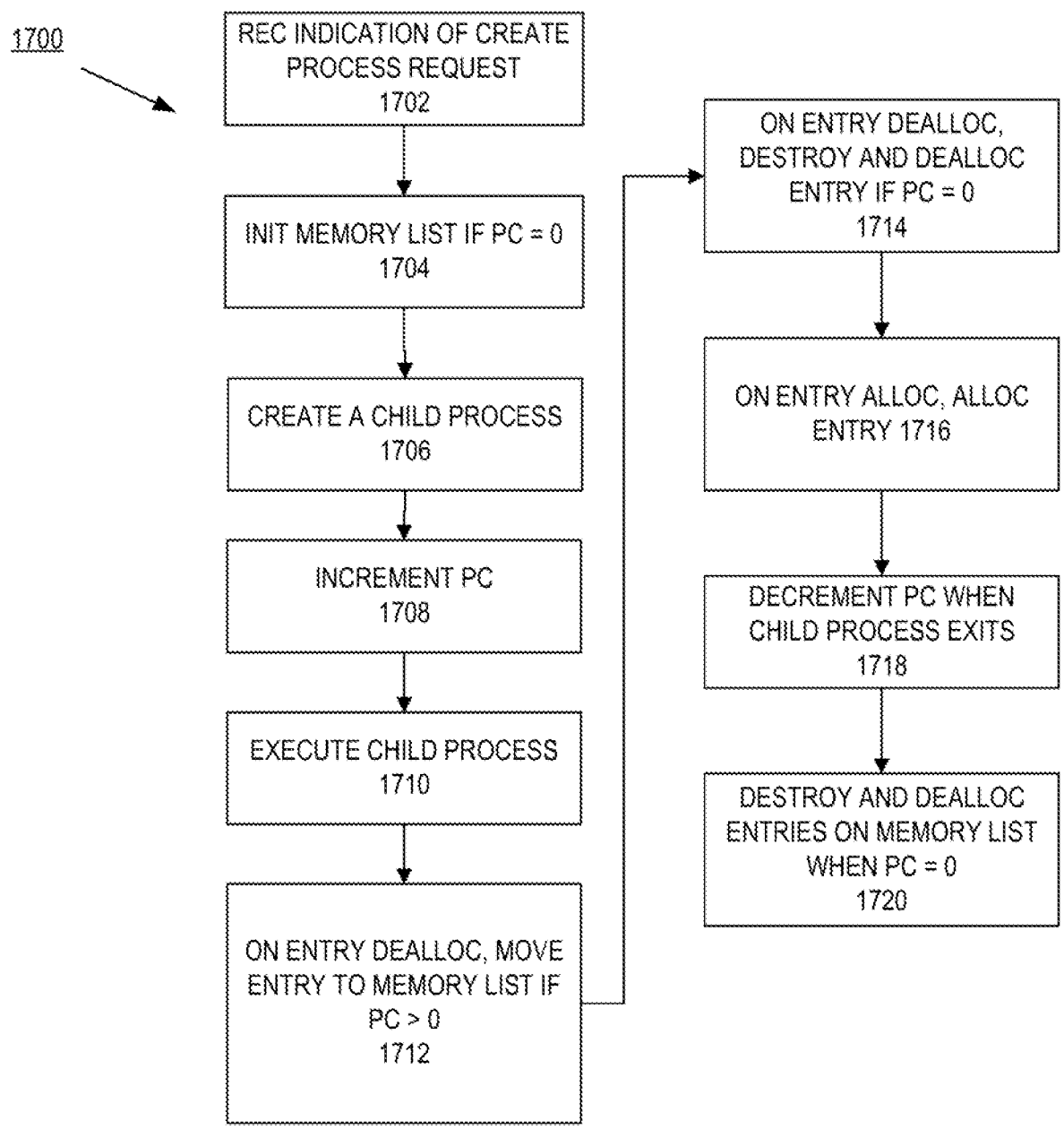
FIG. 17 is a flow diagram of one embodiment of a process to use a memory list for managed a writer memory region.

As described above, process 1600 works for immutable buffers. There can be side effects when an object makes changes in memory when deleted (e.g., some C++ objects with destructors, and C++ objects with virtual tables). Another mechanism described above can use a memory list to prevent deallocation of buffers when the process count is non-zero. FIG. 17 is a flow diagram of one embodiment of a process to use a memory list to manage a writer memory region. In one embodiment, a writer performs process 1700, such as the writer 204 as described in FIG. 2 above. In FIG. 17, process 1700 begins by receiving a process creation indication. In one embodiment, the process creation indication is as described in FIG. 16 above. Process 1700 initializes the memory list if the process counter is zero. When the process counter is zero, there are no child processes executing and, therefore, no entries in the memory list. At block 1706, process 1700 creates a child process and increments the process counter at block 1708. Process 1700 executes the child process at block 1710.

At block 1712, on an entry deallocation, process 1700 moves the entry to the memory list if the process counter is greater than zero. In one embodiment, by putting the entry in the memory list, the entry remains in memory, with the associated object alive and allocated (and, thus, preventing the destructor from firing, changes to the virtual table, and/or other changes from occurring that might interfere with the child process that is executing). If the process counter is zero, on entry deallocation, process 1700 destroys and deallocates the entry at block 1714 (e.g., executing the object's destructor).

On entry allocation, process 1700 allocates the entry at block 1716. Process 1700 further decrements the process counter when a child process exits at block 1718. Process 1700 destroys and deallocates the entries on the memory list when the process counter is decremented to zero at block 1720. When the process counter is zero, there are no child processes executing and the entries in the memory list can safely be destroyed and deallocated.

Figure 18:
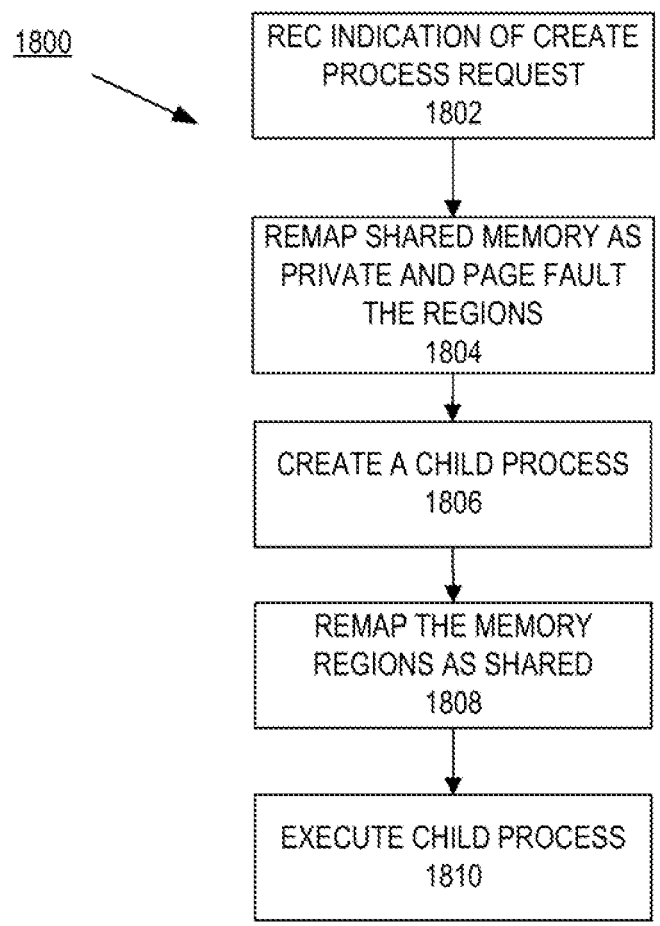
FIG. 18 is a flow diagram of one embodiment of a process to perform a copy on write for process creation for a writer shared memory region.

As described above, the third mechanism performs a copy on write of the shared memory using system calls. FIG. 18 is a flow diagram of one embodiment of a process to perform a copy on write for process creation for a writer memory region. In one embodiment, a writer performs process 1800, such as the writer 204 as described in FIG. 2 above. FIG. 18 begins by receiving a process creation indication at block 1802. In one embodiment, the process creation indication is as described in FIG. 16 above. At block 1804, process 1800 remaps the shared memory as private and copies all the pages in the regions. In one embodiment, process 1800 uses the system API such as mmap/mremap API of the Linux kernel to remap the shared memory regions. In this embodiment, the memory is remapped using MAP_PRIVATE| MAP_POPULATE options. This causes the parent to convert the shared memory region to a private memory region and fault all the pages. The mapping is still file-backed, but changes will not propagate to the file since it is mapped MAP_PRIVATE.

Process 1800 creates a child process at block 1806. In one embodiment, when the child process is created, the child process inherits the MAP_PRIVATE memory mapping option from the previously shared memory. In addition, the MAP_PRIVATE pages are shared between the parent and child processes. At block 1808, process 1800 remaps the shared memory regions as shared. In one embodiment, process 1800 remaps the shared memory region as MAP_SHARED. At this point, the parent process can resume modifying the file-backed shared memory that is visible from other reader processes, and the child process will retain its isolated private mapping. Process 1800 executes the child process at block 1810.

Figure 19:
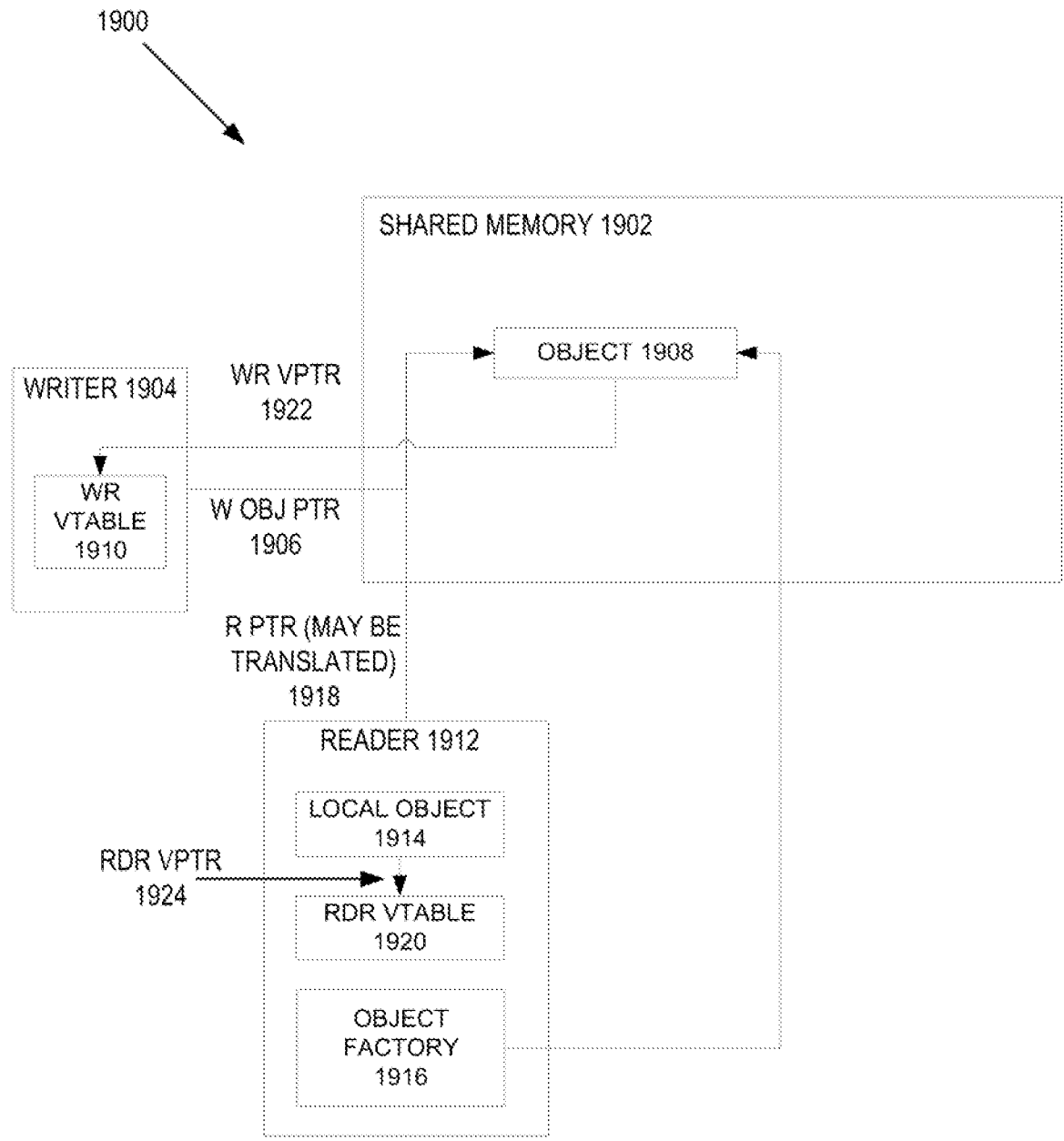
FIG. 19 is a block diagram of one embodiment of a shared memory system with a writer sharing an object type with a reader.

FIG. 19 is a block diagram of one embodiment of a network device 1900 with a writer sharing an object with a reader. In FIG. 19, the network device 1900 includes shared memory 1902, which includes an object 1908 that is stored in the shared memory by the writer 1904. The object 1908 has a virtual table pointer 1922 that references a virtual table 1910 that lives within the writer's private memory. In one embodiment, a reader 1912 can access the object 1908 through a reader pointer 1918 (where the reader pointer can be translated into the memory space of the reader as described above).

In one embodiment, this alternative to using a virtual table pointer export table as described in FIG. 10 above, relies on the fact that the reader 1912 will also need to load the same shared libraries that the writer uses to provide the virtual tables for each virtual type, and that the requirements of the library mean that although it may be at a different address, the relative offsets of everything within that library will be the same in all processes mapping to these libraries.

In one embodiment, the reader 1912 receives the process identifier (pid) of the writer 1904 before the reader 1912 starts to read from the shared memory 1902. In this embodiment, /proc/<pid>/maps is a file that contains information on all the different contiguous virtual memory regions in a given process. The reader 1912 parses the file corresponding to the process identifier of the writer 1902, and builds an internal map of writer memory region start addresses to writer region information. The region information may contain a string signifying the path of the region, as well as the base address of the region, the length of the region, and the permissions of the region.

When the reader 1912 reads an object 1908 that has a virtual pointer 1922 that points to a virtual table 1910 at some address within the writer 1904's private address space, the reader 1912 can search for the writer memory region that contains the address of virtual table 1910 within the writer memory region start address to writer region information map, and get the string that signifies the path of the memory region. Virtual pointer 1922 is not limited to a pointer as any suitable data that enables an index into the virtual table may be utilized. Using the string signifying the path of the region, the reader 1912 can load the same library into its address space. The reader 1912 can maintain a mapping of path string to library, so that it does not need to load the library again in the future. In one embodiment, loading the library can cause static initializers to run in the reader 1912, which populate a global structure with a map of unique type name to object factory instance for any types within that library that have an object factory 1916.

The reader 1912 additionally maintains an internal map of reader memory region start address to reader memory region information. The reader 1912 searches the /proc/<pid>/maps file that corresponds to the process identifier of the reader 1912 for the reader memory region that contains library that was just loaded. The reader 1912 adds an entry mapping the reader memory region start address to the reader memory region information into the reader memory region internal map. The reader 1912 searches the reader memory region internal map for the entry that matches the previously discovered writer memory region information. This may mean that the path, base address, length, and permissions of the writer memory region information match that of the reader memory region information. Using this region information, the reader 1912 can compute the location of the reader virtual table 1920 for the type of the object 1908, and thus the reader 1912 now has the reader virtual table pointer 1924.

In one embodiment, the string type name for a virtual type is uniquely defined by the C++ dynamic type information and stored in the memory space of a process at a known offset from the virtual table pointer. Using the reader virtual table pointer 1924, the reader 1912 can retrieve the string type name using this known offset. With the string type name, the reader 1912 can retrieve the object factory 1916 from the type name to object factory instance map. In one embodiment, the object factory 1916 is an object that can create another object. For example and in one embodiment, an IPv4Route object factory is an object that is used to create an IPv4Route object. The object factory 1916 can be used to process the shared memory object 1908, and in one embodiment, can create a local object 1914 that is a copy of the shared memory object 1908.

If there is not an existing mapping for the virtual table pointer in the cache, the reader needs to make some sense of the pointer in the remote processes address space. An alternative embodiment uses a virtual table pointer export table to resolve the virtual table pointer mapping. In this embodiment, the reader retrieves the writer memory mapping information from in the filesystem to determine the virtual table pointer address. The virtual table pointer address gives the reader the shared library that contains the data for the virtual table pointer, and the offset within that library. The reader can directly open the library by name to get the library loaded into the memory space of the reader.

In one embodiment, by following the virtual table pointer, the object type name can be determined. For example and in one embodiment, by understanding the layout of the fields referenced by the virtual table pointer, the type name can be retrieved. In this embodiment, the type name is the derived type for the object. With the object type, the reader can determine and invoke the corresponding factory for the object, so as to create an instance of the object in the reader's memory space. With this representation of the object in the reader's memory space, the reader can process the object. In some embodiments, the derived type information for the object may be referred to as polymorphic information, i.e., both derived type and base class information.

Figure 20:
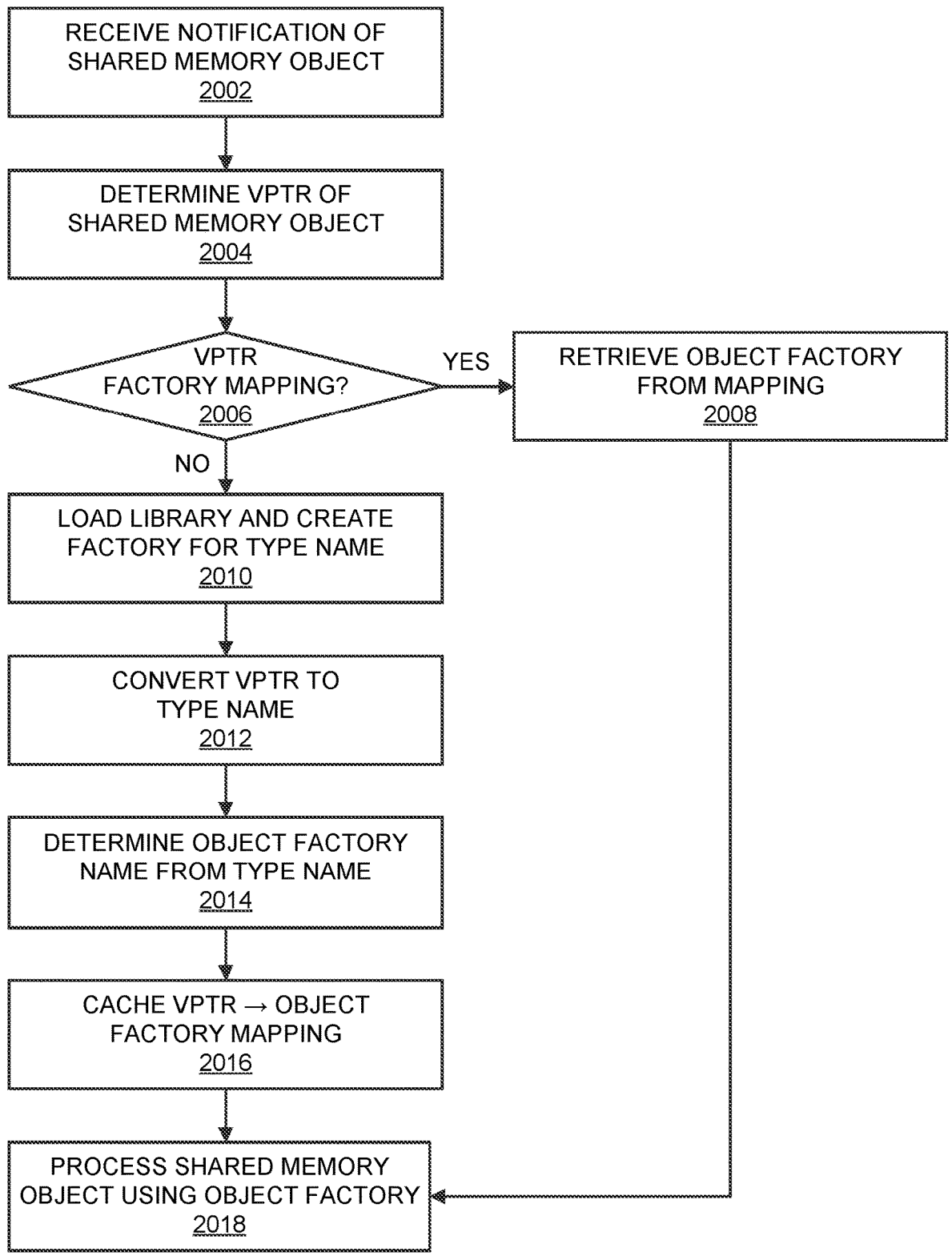
FIG. 20 is a flow diagram of one embodiment of a process to determine an object type.

FIG. 20 is a flow diagram of one embodiment of a reader process 2000 to determine an object type. In FIG. 20, process 2000 begins by receiving a notification for an object in shared memory at block 2002. Process 2000 reads the virtual table pointer from the shared memory object at block 2004. In one embodiment, the virtual table pointer is the virtual table pointer of the object stored in shared memory by the writer. In one embodiment, there can be an object factory mapping that maps the virtual table pointer of the shared memory object to an object factory instance in the reader. Process 2000 uses the virtual table pointer to consult the mapping in block 2006. If the mapping contains an entry for this virtual table pointer, execution proceeds to block 2008, where process 2000 retrieves the object factory using the mapping. Execution proceeds to block 2018 below.

If there is not an object factory mapping entry, execution proceeds to block 2010 where process 2000 loads the library for the virtual table pointer. In one embodiment, when the library loads, an object factory for the type name gets created and added to a mapping of type name to object factory. At block 2012, process 2000 converts the virtual table pointer to a type name. In one embodiment, process 2000 determines the type name by following the virtual table pointer as described above. At block 2014, process 2000 determines an object factory from the type name. At block 2016, process 2000 caches a virtual table pointer to object factory mapping. Process 2000 processes the shared memory object using the object factory at block 2018. In one embodiment, processing the object results in the reader creating a local copy of the object.

In one embodiment, using a simple search can cause the region map pointer translation scheme to perform O(log N) cost lookups to translate a writer pointer to a reader pointer (where N is the number of allocated regions). In one embodiment, on scaled up workloads with thousands of regions, there can be a significant translation overhead of up and/or over 10% of total runtime. In one embodiment, in order to reduce the workload for the pointer translation a new scheme using a shared memory region page mapping can be used to reduce the reader translation cost to a simple O(1) lookup, which can greatly improve runtime overhead for readers. Furthermore, the new scheme will reduce the cost of region creation and deletion for writers.

In one embodiment, there can be scaling issues with the region map approach on both the reader and writer side that uses a simple search. For the reader:

As mentioned above, there is the O(log N) search through the sorted region map on each pointer translation, and Any writer modification to the region map can cause an in-progress reader to restart its search from scratch (as per the lock-free memory protocol)

Furthermore, there can be a writer's cost of maintaining the region map. This too can be significant if there is a significant amount of region creation/deletion churn. When the writer creates or deletes a region, a new region map must be built from scratch (as per the lock-free protocol):

O(N) cost to repopulate the backup region map with all the region entries.

The page mapping scheme avoids these overheads and guarantees O(1) insertion/deletion/translation costs for both the writer and readers. In one embodiment, there are two variants of this scheme:

The shared memory table variant, in which the writer stores translation entries in a shared memory table (e.g., a shared memory hash table), and The direct lookup variant, in which a large, contiguous, fixed size array of translation entries allow each entry to be stored and retrieved by simple array index operations.

In one embodiment, to maintain the lock-free region map protocol, insertions and deletions are not done in place, but instead to a backup map. To build the backup map, all of the entries from the primary map are copied over (minus the deleted entry, if one)—and this obviously incurs the O(N) behavior.

In one embodiment, the data stored in each page mapping table entry describes the translation for a single 4 KB page. As opposed to the region map, where a single entry covers translations for all pages in the region.

In one embodiment, if the writer creates a region of four 4 KB pages with a region identifier of 42 at writer base address 0x10000, the writer will insert four entries into the page mapping. In this embodiment, a key can be created that is used to store and retrieve each entry. In one embodiment, the key to store and retrieve each entry can be created using the top 20-bits of the writer address. Thus in this example the page mapping would contain:

0x10: 0x1000042
0x11: 0x1000042
0x12: 0x1000042
0x13: 0x1000042

In other embodiment, the keys can be created using a different mechanism. For example and in one embodiment, if different page sizes are used for the page mapping table entries, the keys can be generated using different sized sets of bits. In this example, if a system used a 64 KB page size, then the top 16-bits of the writer address can be used as the key. Furthermore, if a system used 2 MB pages, then the top 11-bits of the writer address can be used as the key.

Figure 21:
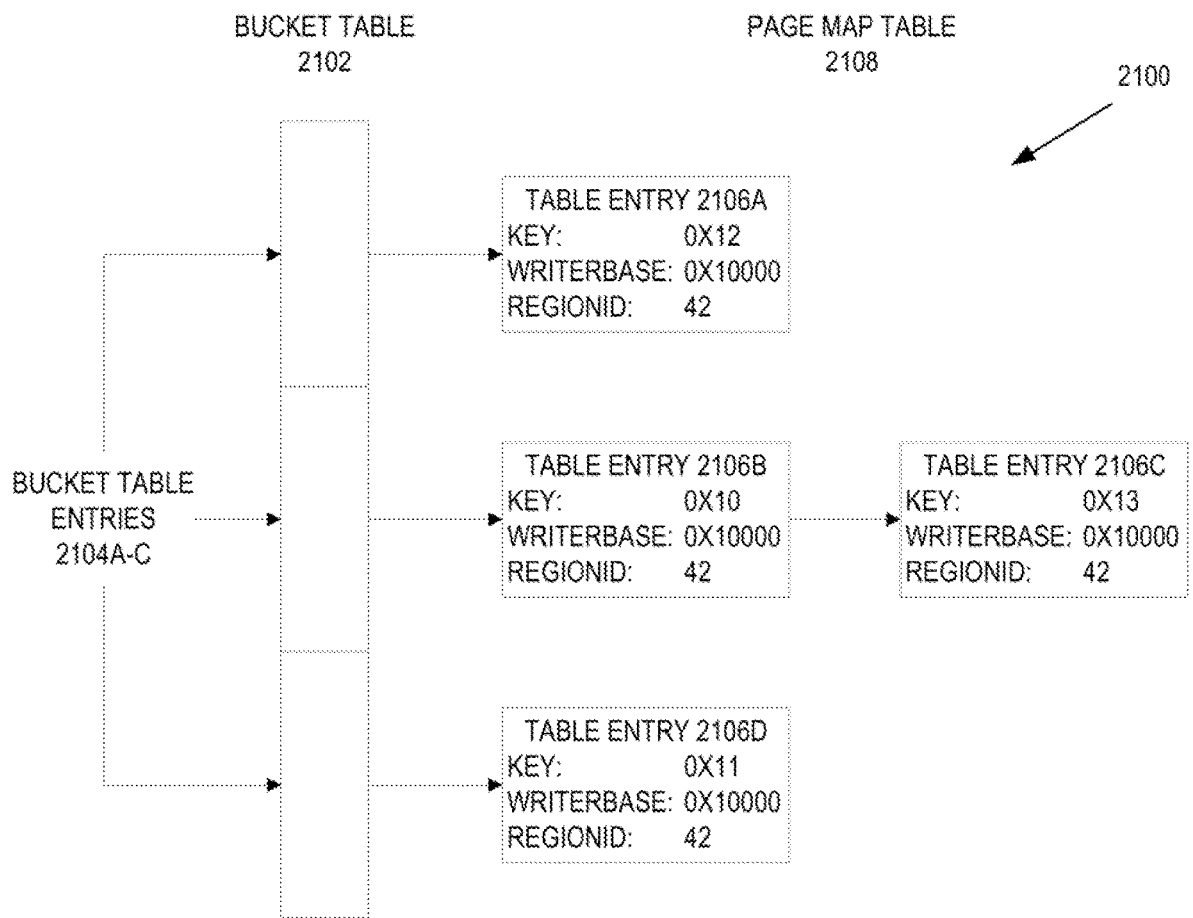
FIG. 21 is a block diagram of one embodiment of a bucket table for storing writer pointer entries.

FIG. 21 is a block diagram of one embodiment of a bucket table 2102 for storing writer pointer entries. In one embodiment, the bucket table 2102 is a shared memory table as the dynamic shared memory hash table with notifications as described in the U.S. patent application Ser. No. 15/187,698, entitled "SYSTEM AND METHOD OF A DYNAMIC SHARED MEMORY HASH TABLE WITH NOTIFICATIONS," filed on Jun. 16, 2016, now U.S. Pat. No. 11,068,469. In one embodiment, the system 2100 includes the bucket table 2102 that includes bucket table entries 2104A-C. In this embodiment, the bucket table 2102 is the bucket table as described in the U.S. patent application Ser. No. 15/187,698, entitled "SYSTEM AND METHOD OF A DYNAMIC SHARED MEMORY HASH TABLE WITH NOTIFICATIONS," filed on Jun. 16, 2016. Each of the bucket table entries points to different table entries 2106A-D that are part of the table 2108. For example and in one embodiment, bucket table entry 2104A points to table entry 2106A, bucket table entry 2104B points to table entry 2106B, and bucket table entry 2104C points to bucket table entry 2106C. In one embodiment, the table entries are accessible from a hash function applied to the key.

In this embodiment, each of the table entries 2106A-D includes the writer base and region identifier corresponding to each key. For example and in one embodiment, table entry 2106A is for the key 0x12 and includes the writer base 0x10000 and region identifier of 42. Furthermore, table entry 2106B is for the key 0x10 and includes the writer base 0x10000 and region identifier of 42. Furthermore, table entry 2106B points to table entry 2106C. In addition, table entry 2106C is for the key 0x13 and includes the writer base 0x10000 and region identifier of 42 and table entry 2106D is for the key 0x11 and includes the writer base 0x10000 and region identifier of 42. In this embodiment, additional table entries can be added or deleted as needed.

Figure 22:
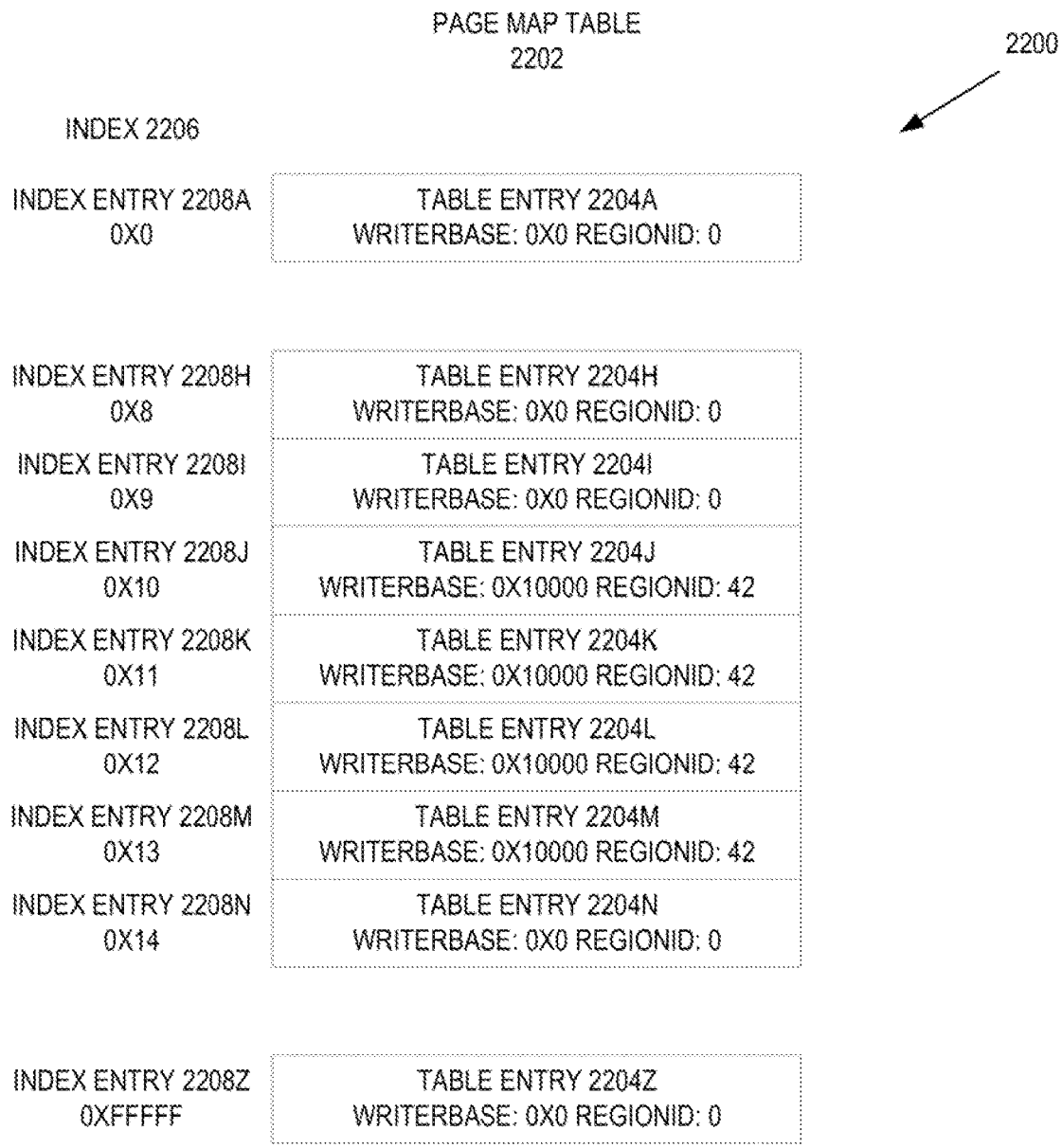
FIG. 22 is a block diagram of one embodiment of a page mapping table for storing writer pointer entries.

As described above, as an alternate for storing is storing the table entries in an array. FIG. 22 is a block diagram of one embodiment of an array for the page mapping table 2202 for storing writer pointer entries. In FIG. 22, the system 2200 includes the page mapping table 2202 and index 2206. The page mapping table 2202 includes table entries 2204A-Z. While in one embodiment, the page mapping table 2202 includes table entries 2204A-Z stored as entries in an array of table entries, in alternate embodiments, the page mapping table 2202 can have more or less numbers of table entries. Furthermore, in one embodiment, there is up to one writer base pointer referenced in each of the table entries 2204A-Z.

In one embodiment, each of the table entries is referenced by an index 2206. For example and in embodiment, index entry 2208A has a value of 0x0 and references table entry 2204A. Each of the other indices have a similar relationship between index entries 2208B-Z and table entries 2206B-Z, respectively. In one embodiment, the page mapping table 2202 is a single linear array in shared memory, starting from index 0x0 until index 0xfffff. As illustrated, the entries in this array are the ones that are occupied by the four entries at index 0x10, 0x11, 0x12 and 0x13.

Figure 23:
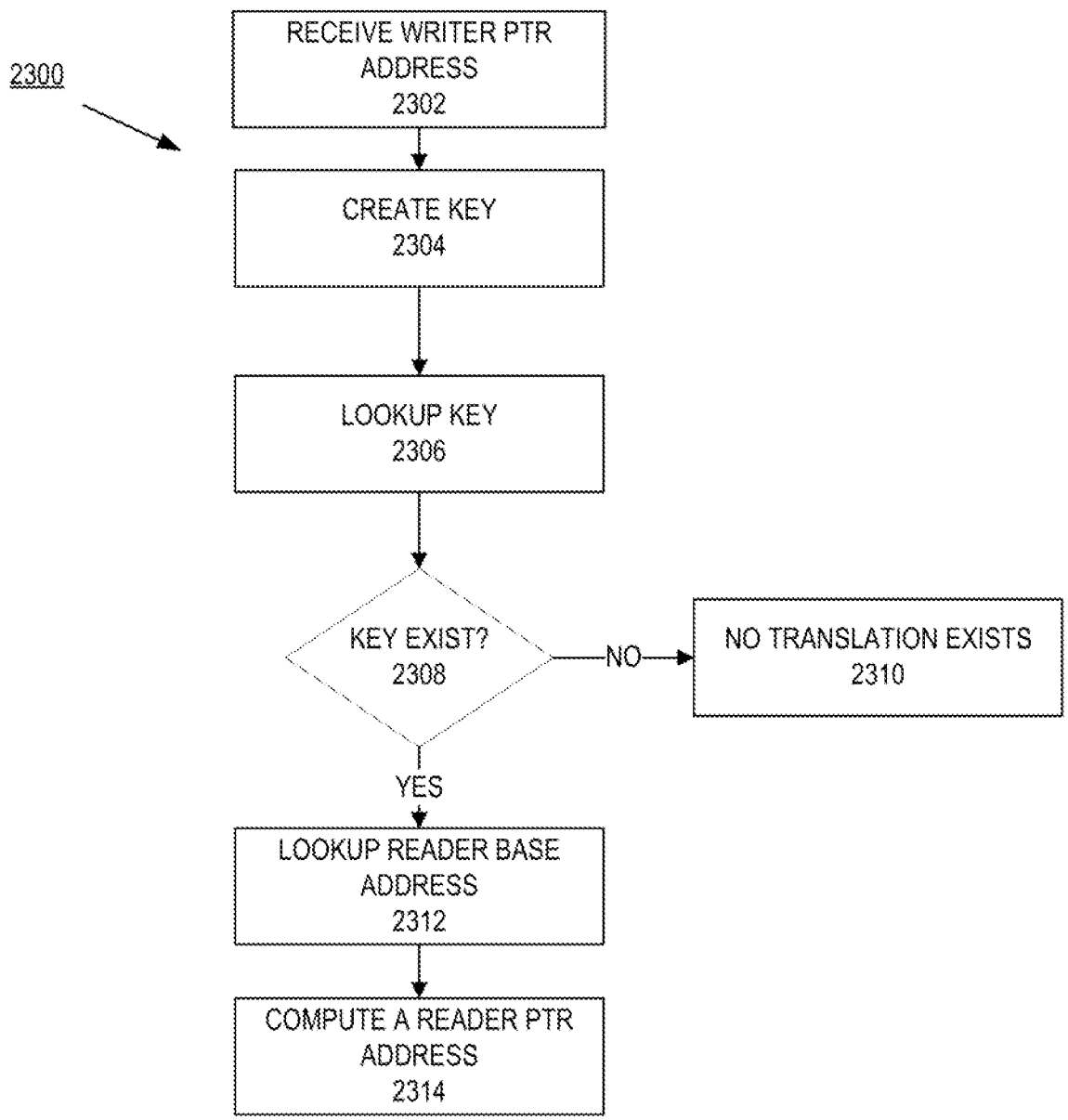
FIG. 23 is a flow diagram of one embodiment of a process to determine a reader pointer from an existing writer pointer.

FIG. 23 is a flow diagram of one embodiment of a process to determine a reader pointer from an existing writer pointer. In FIG. 23, process 2300 begins by receiving a writer pointer address at block 2302. In one embodiment, the writer pointer is an offset from a writer base address for the pointer. At block 2304, process 2300 creates the key for the writer pointer. In one embodiment, process 2300 creates the key by stripping the top 20-bits off the writer pointer address.

At block 2306, process 2300 looks up the key. In one embodiment, how the key is used can depend on how the keys are stored. In one embodiment, if the keys are stored in shared memory table (e.g., a shared memory hash table described above), the key is used to compute a hash value using a hash function, where the hash value is used to look up a bucket table entry as described above. In another embodiment, if the keys are stored in an array, the key is an index into the array and can be used to look up the table entry stored at that index in the array. Process 2300 determines if a key exists at block 2308. If no key exists (e.g., entry not found or entry is filled with zeroes), no translation is available at block 2310.

If a key exists from the lookup, process 2300 looks up the reader base address at block 2312. In one embodiment, the reader base address is stored in a hash table, based on, at least, the region identifier of the entry. Alternatively, process 2300 uses a fixed size, contiguous array of reader base addresses that can be directly map the top 20-bits of the writer pointer to the reader's base address. This alternative can avoid a hash-lookup as per above but is at the expense of extra memory for all possible array entries. At block 2314, process 2300 computes a reader pointer address. In one embodiment, process 2300 computes the reader pointer by adding the difference between the writer pointer and the writer base address to the reader base address.

As per above, the entries can either be stored in an array or a shared memory table. The use of the shared memory table can add additional overhead, whereas an array for the entries needs to be pre-allocated.

Figure 24:
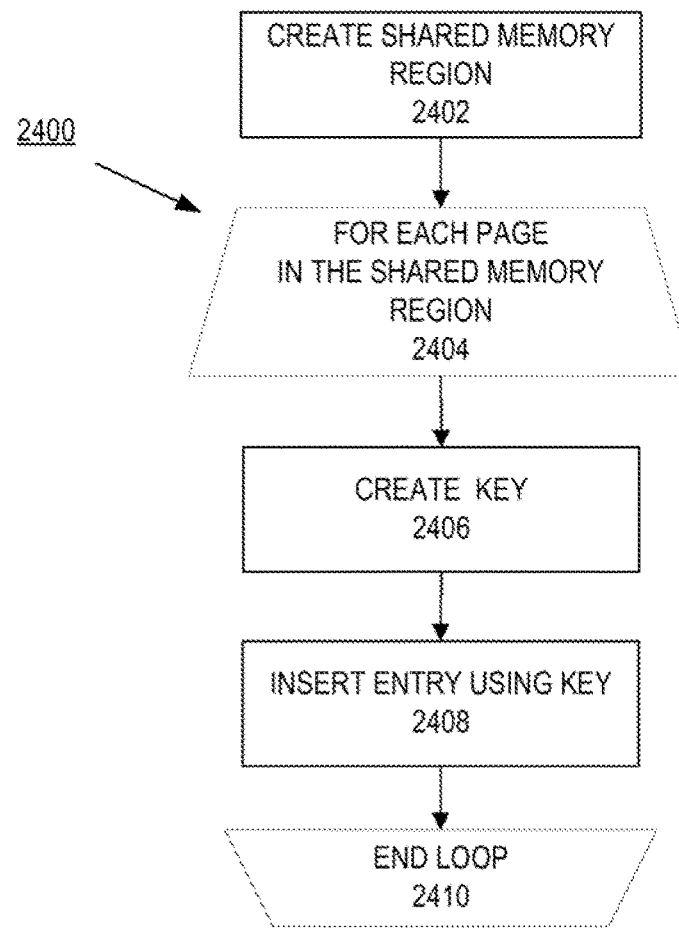
FIG. 24 is a flow diagram of one embodiment of a process to store keys for each page of a shared memory region.

As per above, each of the table entries are used to store information about an allocated shared memory region. In one embodiment, this information can be stored when the shared memory region is allocated. FIG. 24 is a flow diagram of one embodiment of a process 2400 to store keys for each page of a shared memory region. In FIG. 24, process 2400 begins by creating the shared memory region at block 2402. In one embodiment, process 2400 allocates the shared memory regions by allocating a number of memory pages for those regions. For example and in one embodiment, process 2400 can allocate a shared memory region of 32 pages, where each page is 4 kilobytes (KB).

For each of the allocated pages, a table entry will be generated by process 2400. Process 2400 performs a processing loop (blocks 2404-2410) to create and store keys for each of the allocated pages. At block 2406, process 2400 creates a key for the allocate page. In one embodiment, process 2400 creates the key by stripping off the top 20-bits from the page address of the allocated page. Process 2400 uses the created key to insert an entry into the page mapping table. In one embodiment, each entry in the page mapping table includes the writer's base address and the region identifier. In one embodiment, how the entry is stored depends on, in part, the structure of the page mapping table. In one embodiment, if the page mapping table is a shared memory table, insert the table entry using the key, writer base, and region identifier. For example and in one embodiment, if the shared memory table is a hash table, process 2400 performs a hash insert using the key. Alternatively, if the page mapping table is an array, process 2400 can atomically store the writer base and region identifier at the entry specified by the array index indicated by the key. The processing loop ends at block 2410.

Figure 25:
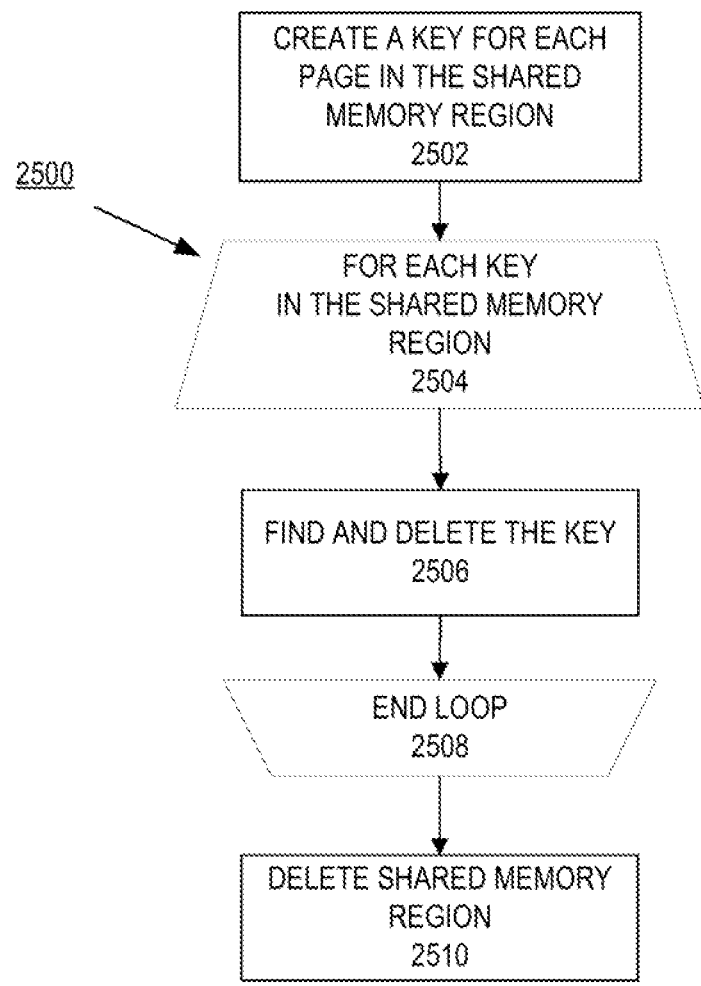
FIG. 25 is a flow diagram of one embodiment of a process to delete a shared memory region.

In addition to storing page information for allocated shared memory regions, this page information should be deleted if a shared memory region is deleted. FIG. 25 is a flow diagram of one embodiment of a process 2500 to delete a shared memory region. In FIG. 25, process 2500 begins by creating a key for each page in the shared memory region that is to be deleted at block 2502. In one embodiment, process 2400 can derive the page addresses for each of the pages in the shared memory region from the base address of this region and the length of the shared memory region.

Process 2500 performs a processing loop (block 2504-2508) to delete the keys in the page mapping table. At block 2506, process 2500 finds and deletes the key in the page mapping table. In one embodiment, how the key is found depend on the structure of the page mapping table. If the page mapping table is a shred memory table process 2500 performs a lookup using the key in the page mapping table, finds the table entry corresponding to the key, and deletes the entry. Alternatively, if the page mapping table is an array, process 2500 can find the entry using the key and zero out the entry. In each embodiment, process 2500 can perform the key deletion using a lock-free operation. For example and in one embodiment, if the page mapping table is a shared memory table, the key deletion can be a lock-free mechanism as described in the U.S. patent application Ser. No. 15/187,698, entitled "SYSTEM AND METHOD OF A DYNAMIC SHARED MEMORY HASH TABLE WITH NOTIFICATIONS," filed on Jun. 16, 2016. Alternatively, if the page mapping table is an array, process 2500 can delete the entries using an atomic operation (e.g., a memory copy to zero out the entry, a memory set to zero, and/or other ways to atomically zero an entry). The processing loop ends at block 2508. At block 2510, with the keys for the pages of the shared memory region deleted from the page mapping table, process 2500 deletes the shared memory region.

In one embodiment, using an array for the page mapping table may be feasible for 32-bit address spaces. For 64-bit address spaces, the number of table entries needed to be pre-allocated could be prohibitive. In this case, the page mapping table can be the shared memory table as described above.

It should be appreciated that in some embodiments the writer process may create a single, local, large anonymous memory mapping, e.g., 32 GB in some embodiments, at some available base address. This embodiment may be referred to as the "hugemem" mapping. The reader will also create a same-sized local "hugemem" mapping, at some convenient available base address (and the base address for the reader doesn't have to be the same base address as the writer). The writer may then carve out regions as needed from this "hugemem," and use those carved out regions for shared memory storage. In one exemplary embodiment, the "hugemem" start address is at writerBase. The writer uses MAP_FIXED to carve out individual 2 MB regions in some embodiments. The reader then creates a similar 32 GB "hugemem" mapping in its address space, at address readerBase, and the reader also uses MAP_FIXED to position each region at the same relative location or offset. This differs to what was described above, which is to allocate regions from anywhere in the address space that is convenient. Instead this embodiment constrains the region allocation to always be within the "hugemem" range. And thus, the reader side pointer translation can simply be:

readerPtr=readerHugeMemBase+(writerPtr−writerHugeMemBase)

Further, if the "hugemem" mappings are arranged such that the writerBase and readerBase are the same, the formula is simply:

readerPtr=writerPtr;

These embodiments are based on the property that the "hugemem" mapping effectively "reserves" its portion of the address space. Nothing else in the process will attempt to claim any part of this memory. Thus, MAP_FIXED can freely be used to dictate which portions of the "hugemem" to carve out for shared memory purposes. It should be appreciated that this technique can be equally applied to both 32-bit and 64-bit. The functionality associated with this embodiment may be embodied as a method to allocate a shared memory buffer accessible by a writer and a reader. The method includes mapping, by the writer, shared memory of a network device to a plurality of writer regions, each writer region having a corresponding writer address and mapping, by the reader, the shared memory of the network device to a plurality of reader regions, each reader region having its own reader address corresponding to a writer address. Responsive to receiving a request to allocate the shared memory buffer for an object, the method includes allocating the shared memory buffer to a writer region of the shared memory, and generating a reader pointer based, at least in part, on the writer pointer and a reader address associated with the writer address of the shared memory buffer. In some embodiments the plurality of writer regions and the plurality of reader regions are equally sized.

Figure 26:
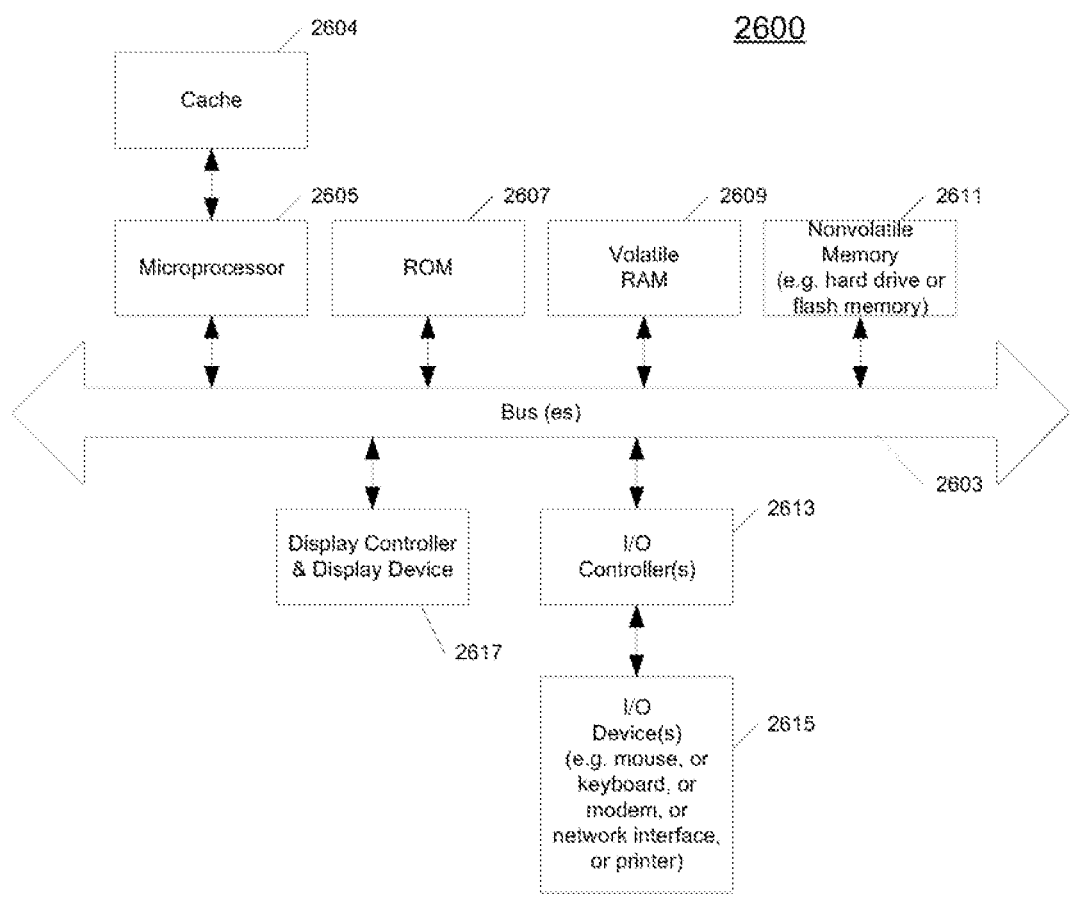
FIG. 26 illustrates one example of a typical computer system, which may be used in conjunction with the embodiments described herein.

FIG. 26 shows one example of a data processing system 2600, which may be used with one embodiment of the present invention. For example, the system 2600 may be implemented including a network device 100 as shown in FIG. 1. Note that while FIG. 26 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 26, the computer system 2600, which is a form of a data processing system, includes a bus 2603 which is coupled to a microprocessor(s) 2605 and a ROM (Read Only Memory) 2607 and volatile RAM 2609 and a non-volatile memory 2611. The microprocessor 2605 may retrieve the instructions from the memories 2607, 2609, 2611 and execute the instructions to perform operations described above. The bus 2603 interconnects these various components together and also interconnects these components 2605, 2607, 2609, and 2611 to a display controller and display device 2617 and to peripheral devices such as input/output (I/O) devices which may be mice, keyboards, modems, network interfaces, printers and other devices which are well known in the art. In one embodiment, the system 2600 includes a plurality of network interfaces of the same or different type (e.g., Ethernet copper interface, Ethernet fiber interfaces, wireless, and/or other types of network interfaces). In this embodiment, the system 2600 can include a forwarding engine to forward network date received on one interface out another interface.

Typically, the input/output devices 2615 are coupled to the system through input/output controllers 2613. The volatile RAM (Random Access Memory) 2609 is typically implemented as dynamic RAM (DRAM), which requires power continually in order to refresh or maintain the data in the memory.

The mass storage 2611 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 2611 will also be a random-access memory although this is not required. While FIG. 8 shows that the mass storage 2611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 2603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 27:
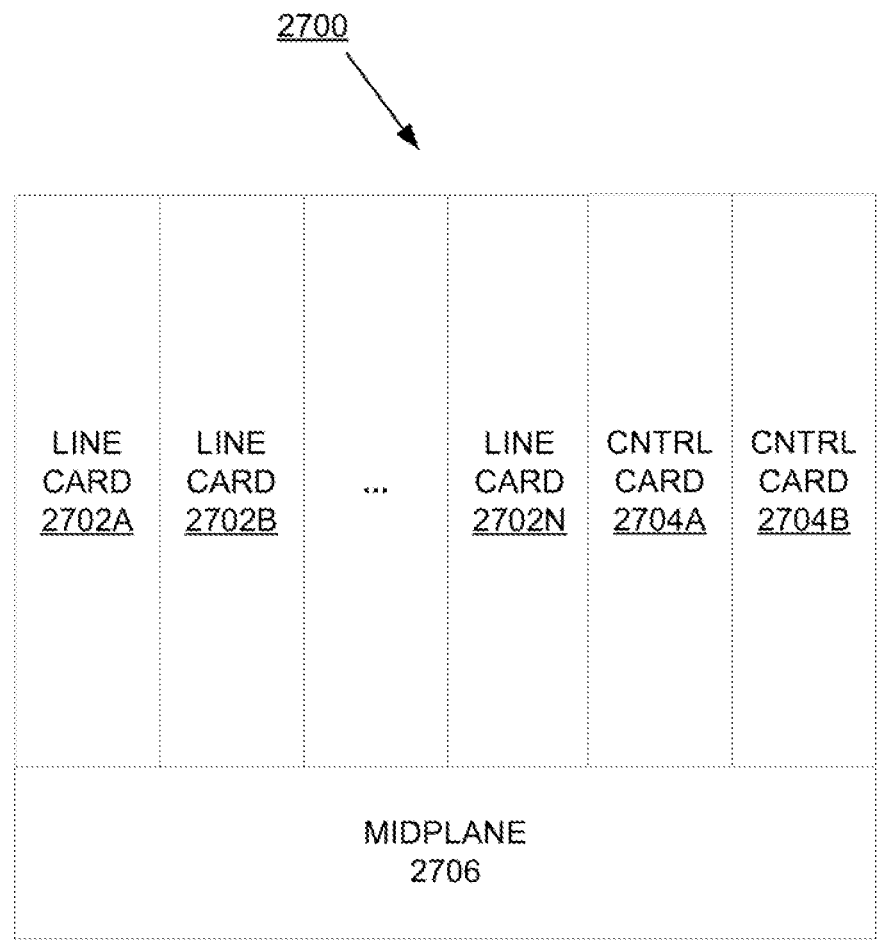
FIG. 27 is a block diagram of one embodiment of an exemplary network device.

FIG. 27 is a block diagram of one embodiment of an exemplary network device 2700. In FIG. 27, the midplane 2706 couples to the line cards 2702A-N and controller cards 2704A-B. While in one embodiment, the controller cards 2704A-B control the processing of the traffic by the line cards 2702A-N, in alternative embodiments, the controller cards 2704A-B, perform the same and/or different functions (e.g., shares buffer pointers between a writer and multiple readers, uses a virtual table, and/or marks and unmarks a writer memory region as described in FIGS. 2-17 above). In one embodiment, the line cards 2702A-N processes network data. It should be understood that the architecture of the network device 2700 illustrated in FIG. 27 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "allocating," "mapping," "determining," "retrieving," "storing," "reading," "returning," "checking," "translating," "caching," "notifying," "loading," "executing," "creating," copying" "incrementing," "marking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to determine an object type for an object shared between a writer and a plurality of readers in a network device, the method comprising:
   receiving the object, the object referenced by a reader pointer for one of the plurality of readers in the network device;
   obtaining data from the received object that enables indexing into a table;
   performing a lookup in the table using the data, the table storing derived type information for a plurality of objects created by the writer;
   identifying an entry for the object in the table;
   retrieving the derived type information for the object related to the entry;
   loading a code associated with the derived type information for the object;
   executing a function using the code; and
   reading a virtual table pointer from the object to locate the object type in the table.

2. The non-transitory machine-readable medium of claim 1, wherein the object is a C++ object, D object, or C# object.

3. The non-transitory machine-readable medium of claim 1, wherein an identifier of the derived type information is stored as a string.

4. The non-transitory machine-readable medium of claim 1, wherein the writer and the plurality of readers have different memory spaces.

5. The non-transitory machine-readable medium of claim 1, wherein the derived type information is an Internet Protocol version 4 (IPv4) route.

6. The non-transitory machine-readable medium of claim 1, further comprising: creating an instance of the object in a memory space of one of the plurality of readers.

7. A method for determining an object type for an object shared between a writer and a plurality of readers in a network device, the method comprising:
   receiving the shared object that is referenced by a reader pointer for one of the plurality of readers in the network device;
   determining a virtual pointer using at least the shared object;
   generating the object type from at least the virtual pointer;
   processing the shared object using at least the object type;
   determining an object factory from the object type; and
   processing the shared object using the object factory,
   wherein the object factory includes a function that processes the shared object.

8. The method of claim 7, further comprising:
   creating an instance of the shared object in a memory space of one of the plurality of readers.

9. The method of claim 8, wherein the determining of the virtual pointer is determined from a writer map that includes a shared library address.

10. The method of claim 8, wherein the object type is generated by retrieving a type name in a field that is offset from the virtual pointer.

11. The method of claim 7, further comprising:
    caching a mapping of the virtual pointer to the object factory in a memory space of one of the plurality of readers.

12. The method of claim 7, wherein the object is a C++ object, a D object, or a C# object.

13. The method of claim 7, further comprising: determining the virtual pointer from a writer map including a shared library address.

14. A network device comprising:
    a processor; and
    a memory communicatively coupled to the processor, the processor storing instructions executable by the processor to perform a method for determining an object type of a shared object, the method comprising:
    receiving the shared object, the shared object being stored in a shared memory and referred to by a reader pointer, the shared memory being shared by a writer and a plurality of readers in the network device;
    determining a virtual table pointer from the shared object;
    looking up a derived type in a table using the virtual table pointer, the table storing a plurality of virtual table pointers and associated derived types;
    loading a code associated with the derived type;
    executing functions on the shared object using the code;
    receiving a writer pointer, the writer pointer being associated with the shared object; and
    translating the writer pointer into the reader pointer.

15. The network device of claim 14, wherein each of the derived types differ from others of the derived types by at least one of a structure, field, size, and function.

16. The network device of claim 14, wherein the writer pointer is used by the writer to access the shared object in the shared memory.

17. The network device of claim 14, wherein the shared object is at least one of a C++ object, D object, and C# object.

18. The network device of claim 14, wherein the derived type is identified in the table by a type name string and the code is loaded based on the type name string.

19. The network device of claim 14, wherein the writer and the plurality of readers have different memory spaces.

20. The network device of claim 14, wherein the derived type is an Internet Protocol version 4 (IPv4) route.

\* \* \* \* \*